United States Patent
Aramaki et al.

(10) Patent No.: US 10,290,069 B2
(45) Date of Patent: May 14, 2019

(54) INFORMATION MANAGEMENT SYSTEM

(71) Applicant: NOMURA RESEARCH INSTITUTE, LTD., Tokyo (JP)

(72) Inventors: Narumi Aramaki, Tokyo (JP); Nobuya Saitoh, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 237 days.

(21) Appl. No.: 15/077,490

(22) Filed: Mar. 22, 2016

(65) Prior Publication Data

US 2016/0203570 A1  Jul. 14, 2016

Related U.S. Application Data

(63) Continuation of application No. PCT/JP2014/078028, filed on Oct. 22, 2014.

(30) Foreign Application Priority Data

| Oct. 22, 2013 | (JP) | 2013-218804 |
| Apr. 11, 2014 | (JP) | 2014-081804 |
| Aug. 28, 2014 | (JP) | 2014-173600 |

(51) Int. Cl.
G06Q 40/00 (2012.01)
G06Q 50/18 (2012.01)
G06Q 10/10 (2012.01)

(52) U.S. Cl.
CPC ............ *G06Q 50/18* (2013.01); *G06Q 10/10* (2013.01); *G06Q 40/12* (2013.12)

(58) Field of Classification Search
USPC .............................................. 705/36 R, 35
See application file for complete search history.

(56) References Cited

U.S. PATENT DOCUMENTS

| 6,640,249 B1 | 10/2003 | Bowman-Amuah |
| 2002/0087445 A1 | 7/2002 | Kaniwa et al. |

(Continued)

FOREIGN PATENT DOCUMENTS

| JP | 2000-020618 | 1/2000 |
| JP | 2001-188873 | 7/2001 |

(Continued)

OTHER PUBLICATIONS

International Preliminary Report on Patentability with Written Opinion of the International Searching Authority dated Apr. 26, 2016 in corresponding International Patent Application No. PCT/JP2014/078028.

International Search Report dated Jan. 13, 2015 in corresponding International Patent Application No. PCT/JP2014/078028.

(Continued)

*Primary Examiner* — Samica L Norman

(57) ABSTRACT

An information management system stores, in a storage area, for an agreement information that classifies the content of the agreement into at least two information elements including agreement information, and cash flow information indicating parameters to calculate a settlement amount and/or a settlement date for a cash flow. The information management system generates, by at least one hardware processor, from the at least two information elements, records of cash flow detail information indicating a plurality of occurrences of cash flows according to the parameters to calculate the settlement amount and/or the settlement date for the cash flows, and updates the records of cash flow detail information in response to detections of occurrences of settlement events according to the parameters to calculate the settlement amount and/or the settlement date for the cash flows.

8 Claims, 16 Drawing Sheets

(56) References Cited

U.S. PATENT DOCUMENTS

| | | |
|---|---|---|
| 2006/0015818 A1 | 1/2006 | Chaudhri |
| 2006/0167704 A1 | 7/2006 | Nicholls |
| 2007/0055609 A1 | 3/2007 | Whitehurst et al. |
| 2007/0118813 A1 | 5/2007 | Forstall |
| 2008/0010200 A1 | 1/2008 | Smith et al. |
| 2009/0216634 A1 | 8/2009 | Peltonen |
| 2009/0276351 A1 | 11/2009 | Faratin |
| 2010/0114729 A1 | 5/2010 | Chu |
| 2013/0268437 A1 | 10/2013 | Desai |

FOREIGN PATENT DOCUMENTS

| | | |
|---|---|---|
| JP | 2002-183176 | 6/2002 |
| JP | 2003-223554 | 8/2003 |
| JP | 2008-140411 | 6/2008 |
| JP | 2010-250619 | 11/2010 |
| JP | 2013-514593 | 4/2013 |
| KR | 10-2011-0082700 | 7/2011 |
| WO | WO 2009/139777 A1 | 11/2009 |

OTHER PUBLICATIONS

"Introduction to Money Learning MS Software Overnight", Sofmap World Hyper, vol. 38, Sofmap, Oct. 1998, 7 pages.
"Doing Business with PCs", Easy PC, vol. 2, No. 36, Deagostini, Nov. 24, 1998, 6 pages.
Written Opinion dated Mar. 31, 2016 in related Singaporean Patent Application No. 11201602364T; (10 pages).
European Office Action dated Sep. 29, 2017 in related European Patent Application No. 14855253.2 (7 pages).
Japanese Office Action dated Feb. 28, 2017 in corresponding Japanese Patent Application No. 2014-173600 (3 pages) (3 pages English Translation).
Written Opinion dated Jul. 11, 2017 in related Singaporean Patent Application No. 11201602364T (7 pages).
Extended European Search Report dated Feb. 8, 2017 in related European Patent Application No. 14855253.2 (10 pages).
Wikipedia: "*Web widget—Wikipedia*"; Oct. 16, 2013 (Oct. 16, 2013), XP055340520, retrieved from the Internet: URL:http://en.wikipedia.org/w/index/php?title=Web_widget&oldid=577458614[retrieved on Jan. 31, 2017] pp. 1-4.
First Chinese Office Action dated Jan. 2, 2019 in related Chinese Patent Application No. 201480053302.3 (7 pages) (8 pages English Translation).

FIG. 6

| OTC Derivatives > | Treasury > | Reference Data > | | Menu... |

Dashboard-Sub Board

Trade Entry status
- Sample Item1-1
- Sample Item2-1
- Sample Item3-1

Settlement CF Status
- Sample Item1-1
- Sample Item2-1
- Sample Item3-1

CF Fixing Status
- Sample Item1-1
- Sample Item2-1
- Sample Item3-1

Monthly Calendar
- Sample Item1-1
- Sample Item2-1
- Sample Item3-1

Today's Task

SWAP Trade Entry — 110

| Field | Value | | Optional Information |
|---|---|---|---|
| Trade Type | SWAP | | Trader |
| Sub Trade Type | Interest Rate Swap | | Designer |
| Reference No | RefNo-00001 | | Documentation |
| Counterparty Party A | Counterparty 1 | | Sales Code |
| | Cashflow A↓ ↑Cashflow B | | Buy Sell Type: Buy |
| Party B | Test Entity | | Swaption ☐ |
| Trade Date | 2012-10-16 | | Periodical Event Check |
| Start Date | 2012-10-22 | | 1 Event Check is applied |
| End Date [Adjust] | 2017-10-22 | | Go to Periodical Event Settings... |
| Initial Notional | | | Remarks |
| Cashflow A JPY | 8,000,000,000 | | |
| Cashflow B USD | 100,000,000.00 | | |
| Gross/Net | Trade Net | | |

Go to CF List

FIG. 7

Dashboard-Sub Board

Trade Entry status
Sample Item1-1
Sample Item2-1
Sample Item3-1

Settlement CF Status
Sample Item1-1
Sample Item2-1
Sample Item3-1

CF Fixing Status
Sample Item1-1
Sample Item2-1
Sample Item3-1

Monthly Calendar
Sample Item1-1
Sample Item2-1
Sample Item3-1

Today's Task

OTC Derivatives > | Treasury > | Reference Data > | Menu...

Single CF Entry  — 112

CF Type: Initial Exchange
Payment Date: [Adjust] 2012-10-22
Notional: JPY 8,000,000,000
Direction: Payment
Amount: JPY 8,000,000,000

SSI
Default SSI ☑
Custom SSI
Party A Receipt
Party B Payment
Party B Receipt Back to CF List

FIG. 8

| OTC Derivatives > | Treasury > | Reference Data > | | | | | | | Menu... |

Dashboard-Sub Board

Trade Entry status
- Sample Item1-1
- Sample Item2-1
- Sample Item3-1

Settlement CF Status
- Sample Item1-1
- Sample Item2-1
- Sample Item3-1

CF Fixing Status
- Sample Item1-1
- Sample Item2-1
- Sample Item3-1

Monthly Calendar
- Sample Item1-1
- Sample Item2-1
- Sample Item3-1

Today's Task

Interest Parameter Entry — 114 — Back to CF List

| Calculation Period | Adjust | 2012-10-12 ~ 2017-10-12 | Adjust |
|---|---|---|---|

| Calculation Role | No | Date(MM-DD) |
|---|---|---|
| | 1 | 12-12 |
| | 2 | 02-12 |
| | 3 | 05-12 |
| | 4 | 08-12 |

Edge Included: On Side Day
Payment at: Calculation End
Notional: JPY  8,000,000,000
DCF: Actual / 360
Round Type: Round Down

SSI
Default SSI ☑
Custom SSI

Party A Receipt
Party B Payment
Party B Receipt

CF Coupled Event Check
1 Event Check is applied
Go to CF Coupled Event Settings...

Interest Structure [Floating Rate]

Fixed Amount
Fixed Rate                          %

Floating Rate
INDEX: 3MYL
Leverage: 1          Spread: 0   bp
Fixing Timing: Calculation End   2 Days Before
Round Type: Round Down   Round at 1/1000000
Cap: 0 %   Floor: 0 %

Exotic Interest    Go to Exotic Interest Entry...

Notional Amortization / Accumulation [Amortization]
Per 2   Payment
Amount 1,000,000

Remarks

FIG. 9

| Dashboard-Sub Board | Exotic Interest Entry | | | | | Back to Interest Parameter Entry | Menu... |
|---|---|---|---|---|---|---|---|
| Trade Entry status | Notional | JPY ▼ | 8,000,000,000 | | DCF Acuual/360 ▼ | Round Type Round Down ▼ | |

INDEX

| No | INDEX | Description | | Round Type | Round at |
|---|---|---|---|---|---|
| 1 | 3MYL | BBA 3M LIBOR | | Round To | 1/10000 |
| 2 | JPNU-USD\|JPY | REUTERS JPNU 15 | | Round Down | 1/10000000 |

Fixing timing

Calculation End ▼ 2 Days Before ▼

Additional Adjust [Adjust]

Formula

| No | Reference | Foumulas |
|---|---|---|
| 1 | | IR *8,000,000,000 * 30/360 |
| 2 | IR1 | 4% - 3MYL |
| 3 | IR2 | 2% - 3MYL |

| UNIT | Round Type | Round at |
|---|---|---|
| Interest | Round Down | 1/10000000 |
| Interest | Round Down | 1/10000000 |

Selectable Formula

| No | Reference | Strike | | INDEX | Strike | Formulas |
|---|---|---|---|---|---|---|
| 1 | IR | 85.00 | > | JPNU-USD\|JPY | 85.00 | IR1 |
| 2 | IR | 85.00 | ≤ | JPNU-USD\|JPY | | IR2 |

Cap / Floor Settings

| No | Reference | UNIT | Cap | Floor |
|---|---|---|---|---|
| 1 | IR1 | Interest | | 0% |
| 2 | IR2 | Interest | | 0% |

FIG. 11

| Confirmation | Status | Due Date | Product Type | Contract No. | CF No. | CF Type | CF Sub Type | Direction | Ccy | Amount | Net type | Net Amount |
|---|---|---|---|---|---|---|---|---|---|---|---|---|
| ☐ | Unconfirmed | 2013-12-24 | Loans | 001 | 001101 | Front Fee | Fix Amount | Pay | JPY | 123,456 | Gross | 123,456 |
| ☑ | Confirmed | 2013-12-24 | Loans | 001 | 001102 | Interest | Fix Rate | Rec | JPY | 444,000 | Trade Net | 444,000 |
| ☑ | Confirmed | 2013-12-24 | Derivatives | 002 | 002334 | Interest | Fix Rate | Rec | USD | 1,234.00 | Trade Net | 1,234.00 |
| ☐ | Unfixed | 2013-12-24 | Derivatives | 002 | 002335 | Interest | Floating Rate | Rec | JPY | **** | Trade Net | **** |
| ☑ | Confirmed | 2013-12-24 | Derivatives | 004 | 004555 | Final Exchange | Fix Amount | Pay | JPY | 444,000 | Trade Net | |
| ☑ | Confirmed | 2013-12-24 | Derivatives | 004 | 004556 | Final Exchange | Fix Amount | Pay | JPY | 555,000 | Trade Net | 999,000 |
| ☐ | Unconfirmed | 2013-12-24 | Futures | 005 | 005111 | Front Fee | Exotic | Pay | JPY | 30,000 | Trade Net | 30,000 |

FIG. 12

| Confirmation | Status | Interest Rate Date | Due Date | Product Type | Contract No. | CF No. | CF Type | INDEX | Rate | Ccy | Amount |
|---|---|---|---|---|---|---|---|---|---|---|---|
| ☑ | Confirmed | 2013-12-24 | 2013-12-25 | Loans | 006 | 006222 | Interest | 3MYLIBOR | 0.1886 | JPY | 123,456 |
| ☑ | Confirmed | 2013-12-24 | 2013-12-27 | Loans | 006 | 006223 | Interest | 6MYLIBOR | 0.3116 | JPY | 444,000 |
| ☑ | Confirmed | 2013-12-24 | 2014-1-10 | Derivatives | 007 | 007001 | Final Exchange | 6758.T-LP | **** | JPY | **** |
| ☑ | Confirmed | 2013-12-24 | 2014-1-24 | Derivatives | 007 | 007002 | Final Exchange | N225-High | **** | JPY | **** |
| ☑ | Confirmed | 2013-12-24 | 2013-12-27 | Derivatives | 008 | 008101 | Interest | JPNU-USD|JPY | 79.13 | JPY | 1,234.00 |
| ☑ | Confirmed | 2013-12-24 | 2013-12-28 | Derivatives | 008 | 008102 | Interest | CNJB-EUR|JPY | 103.6 | EUR | 1234,000 |
| ☑ | Confirmed | 2013-12-24 | 2014-1-24 | Derivatives | 008 | 008103 | Interest | TOPIX-SP | **** | JPY | **** |

FIG. 14B

| OTC Derivatives | Treasury | Reference Data |

Settlement CF Query Result                                                                                   [Query] [Result] [Affirmation] [Menu...]

| | Status | Pay Date | Reference No | CF No | C/P | CF Type | CF Sub Type | Direction | Ccy | Amount | Net Type | Net Direction | Net Ccy | Net Amount |
|---|---|---|---|---|---|---|---|---|---|---|---|---|---|---|
| ☐ | Unconfirm | 2012-11-15 | RefNo-001 | 000012321 | C/P1 | Front Fee | Fix Amount | Pay | JPY | 123,456 | Gross | Pay | JPY | 123,456 |
| ☐ | Confirmed | 2012-10-21 | RefNo-001 | 000012334 | C/P1 | Interest | Fix Amount | Rec | JPY | 444,000 | Trade Net | Rec | JPY | 444,000 |
| ☐ | Confirmed | 2013-02-16 | RefNo-002 | 0001243343 | C/P2 | Interest | Fix Rate | Rec | USD | 1,234.00 | Trade Net | Rec | USD | 1,234.00 |
| ☐ | Unixed | 2012-10-21 | RefNo-002 | 0784566444 | C/P2 | Interest | Floating Rate | Rec | JPY | ***** | Trade Net | ***** | ***** | ***** |
| ☐ | Unixed | 2013-02-16 | RefNo-003 | 9876453321 | C/P3 | Interest | Floating Rate | Rec | JPY | ***** | Trade Net | | | |
| ☐ | Unconfirm | 2013-02-16 | RefNo-003 | 1234566789 | C/P3 | Interest | Exotic | Rec | JPY | 900,000 | Trade Net | ***** | ***** | ***** |
| ☐ | Confirmed | 2013-10-10 | RefNo-004 | 1111222455 | C/P4 | Final Exchange | Fix Amount | Pay | JPY | 444,000 | Trade Net | | | |
| ☐ | Confirmed | 2013-10-10 | RefNo-004 | 1502222001 | C/P4 | Final Exchange | Fix Amount | Pay | JPY | 555,000 | Trade Net | Pay | JPY | 999,000 |
| ☐ | Confirmed | 2013-10-21 | RefNo-005 | 0012000510 | C/P5 | Interest | Fix Rate | Rec | JPY | 333,000 | Trade Net | | | |
| ☐ | Confirmed | 2013-10-21 | RefNo-005 | 1233210123 | C/P5 | Interest | Exotic | Pay | JPY | 1,000 | Trade Net | Rec | JPY | 332,000 |

| OTC Derivatives | Treasury | Reference Data |
| --- | --- | --- |

Trade Query Result                                                                                   [Query] [Result] [Trade Report] [Approve] [Delete]

| | Approval | Status | Reference No | Product Type | Sub Type | Counterparty/Issuer | Trade Date | Start Date | End Date | Notional |
| --- | --- | --- | --- | --- | --- | --- | --- | --- | --- | --- |
| ☐ | Approved | New | RefNo-00001 | SWAP | IRS | C/P1 | 2012-12-01 | 2012-12-01 | 2012-12-01 | JPY 1,000,000,000 |
| ☐ | Waiting | New | RefNo-00002 | MTN | EX-TARN | C/P2 | 2012-12-01 | 2012-12-01 | 2012-12-01 | JPY 1,000,000,000 |
| ☐ | Waiting | Amend | RefNo-00003 | OPTION | EQUITY | C/P3 | 2012-12-01 | 2012-12-01 | 2012-12-01 | JPY 1,000,000,000 |
| ☐ | Approved | Terminated | RefNo-00004 | FORWARD | EQUITY | C/P4 | 2012-12-01 | 2012-12-01 | 2012-12-01 | JPY 1,000,000,000 |
| ☐ | Waiting | New | RefNo-00004 | MTN | Nikei225 | C/P5 | 2012-12-01 | 2012-12-01 | 2012-12-01 | JPY 1,000,000,000 |
| | | | | | | | | | | |
| | | | | | | | | | | |
| | | | | | | | | | | |

← 162

INFORMATION MANAGEMENT SYSTEM

CROSS-REFERENCE TO RELATED APPLICATIONS

This application is a continuation application filed under 35 U.S.C. § 111(a) of PCT International Patent Application No. PCT/JP2014/078028, filed Oct. 22, 2014, which claims the foreign priority benefit under 35 U.S.C. § 119 of Japanese Patent Application No. 2014-173600, filed Aug. 28, 2014, Japanese Patent Application No. 2013-218804, filed Oct. 22, 2013, and Japanese Patent Application 2014-081804, filed Apr. 11, 2014, the contents of which are incorporated herein by reference.

BACKGROUND OF THE INVENTION

1. Field of the Invention

The present invention relates to a technique for supporting management of information that specifies transfer of money, an article, or a right related to the money or article at a future time.

2. Description of the Related Art

When a financial transaction is conducted bilaterally, such as a transaction of an over-the-counter derivative (financial derivative) or bond, a contract is made between the parties before the transaction is started. With regard to a contract for such a financial transaction, there is a basic agreement called "ISDA Master Agreement" published by the International Swaps and Derivatives Association (ISDA), by which contract details are standardized at a certain level. However, actual financial transaction contracts are diversified, and items determined in a contract or details of each item are multifarious.

Also, in a financial transaction contract, an amount of money transferred between the parties, i.e., a settlement amount, may not be determined at the time of contract, and a condition for determining the amount at a future time may be set at the time of contract. For example, when it is determined that a party A pays interest to a party B six months after the contract date, instead of the settlement amount itself, a condition for determining the settlement amount may be set at the time of contract. Also, when settlement is performed at a future time according to an agreement, such as a contract defining a date of settlement to be performed in the future or a condition for performing settlement, there may be a case where the settlement amount needs to be determined and the amount thus determined needs to be confirmed before the settlement is performed.

In this way, when an agreement is made in which a settlement date in the future is set, there may be a case where a settlement amount determined ex-post facto needs to be calculated according to the agreement, and settlement processing needs to be performed to actually transfer the calculated amount of money according to a condition defined in the agreement. Therefore, advanced information management is required to observe agreements.

[Patent Document 1] Published Japanese Translation of PCT Application No. 2013-514593

[Patent Document 2] Japanese Patent Application Laid-open No. 2008-140411

An agreement defining future settlement is not limited to a financial transaction contract, and such settlement includes settlement of a dividend or the like on valuable securities including a stock certificate. Thus, agreements defining execution of transfer of money, an article, or a right related to the money or article (hereinafter, also referred to as "property") at a future time are diversified, and items in an agreement or details of each item are multifarious. Accordingly, management of various agreements defining settlement dates in the future and conditions for performing settlement has been scarcely systematized. Information systems have been used merely for prediction of future value or risk calculation, as described in the Patent Document 1; or they have been used for management of the same type of contract information, as described in the Patent Document 2. Therefore, the inventors have considered that there have not been sufficiently proposed specific methods for effectively supporting operations for implementing each of multifarious agreements that have the feature in common of specifying transfer of money or an article at a future time.

SUMMARY OF THE INVENTION

The present invention has been made on the basis of the aforementioned problem recognized by the inventors, and a major purpose thereof is to effectively support operations for implementing each of multifarious agreements that have the feature in common of specifying transfer of property at a future time.

To solve the problem above, an information management system according to an embodiment of the present invention includes: an agreement information storage unit that stores information specified in each of a plurality of types of agreements, which each define transfer of money, an article, or a right related to the money or article at a future time, in which the information is classified into basic information including the subject and period of an agreement, a flow condition specifying a condition for transfer of money, an article, or a right related to the money or article at a future time, and event information specifying an additional condition that affects the basic information or the flow condition; and a basic information registration unit that receives basic information specified in each of the plurality of types of agreements and input via an external device and that stores basic information of each agreement in the agreement information storage unit.

Another embodiment of the present invention is also an information management system. The information management system includes: an agreement information storage unit that stores information specified in each of a plurality of types of agreements, which each define transfer of money, an article, or a right related to the money or article at a future time, in which the information is classified into basic information including the subject and period of an agreement, a flow condition specifying a condition for transfer of money, an article, or a right related to the money or article at a future time, and event information specifying an additional condition that affects the basic information or the flow condition; and a flow condition registration unit that receives a flow condition specified in each of the plurality of types of agreements and input via an external device and that stores a flow condition of each agreement in the agreement information storage unit.

Yet another embodiment of the present invention is also an information management system. The information management system includes: an agreement information storage unit that stores information specified in each of a plurality of types of agreements, which each define transfer of money, an article, or a right related to the money or article at a future time, in which the information is classified into basic information including the subject and period of an agreement, a flow condition specifying a condition for transfer of money, an article, or a right related to the money or article at a future time, and event information specifying an additional condition that affects the basic information or the flow condition; and an event information registration unit that receives event information specified in each of the plurality of types of agreements and input via an external device and that stores event information of each agreement in the agreement information storage unit.

Still yet another embodiment of the present invention is also an information management system. The information management system includes: an agreement information storage unit that stores information specified in each of a plurality of types of agreements, which each define transfer of money, an article, or a right related to the money or article at a future time, in which the information is classified into basic information including the subject and period of an agreement, a flow condition specifying a condition for transfer of money, an article, or a right related to the money or article at a future time, and event information specifying an additional condition that affects the basic information or the flow condition; and a management screen generating unit that extracts, from among basic information, flow conditions, and event information stored in the agreement information storage unit, information of a predetermined item required for each of a plurality of kinds of operations related to management of an agreement and that generates a management screen for supporting each of the plurality of kinds of operations.

A further embodiment of the present invention is also an information management system. The information management system includes: an agreement information storage unit that stores information specified in each of a plurality of types of agreements, which each define transfer of money, an article, or a right related to the money or article at a future time, in which the information is classified into basic information including the subject and period of an agreement, a flow condition specifying a condition for transfer of money, an article, or a right related to the money or article at a future time, and event information specifying an additional condition that affects the basic information or the flow condition; and a management screen generating unit that generates a management screen collectively displaying basic information of the plurality of types of agreements, a management screen collectively displaying flow conditions of the plurality of types of agreements, and a management screen collectively displaying event information of the plurality of types of agreements, with reference to basic information, flow conditions, and event information stored in the agreement information storage unit.

Optional combinations of the aforementioned constituting elements, and implementations of the present invention in the form of methods, programs, and recording media storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows a basic information entry screen;

FIG. 7 shows a CF information entry screen;

FIG. 8 shows another CF information entry screen;

FIG. 9 shows yet another CF information entry screen;

FIG. 11 shows a due date based management screen in FIG. 1;

FIG. 12 shows an interest rate date based management screen in FIG. 1;

FIG. 14B shows a settlement management details screen; and

FIG. 14C shows a monthly schedule details screen.

DETAILED DESCRIPTION OF THE INVENTION

Figure 1:
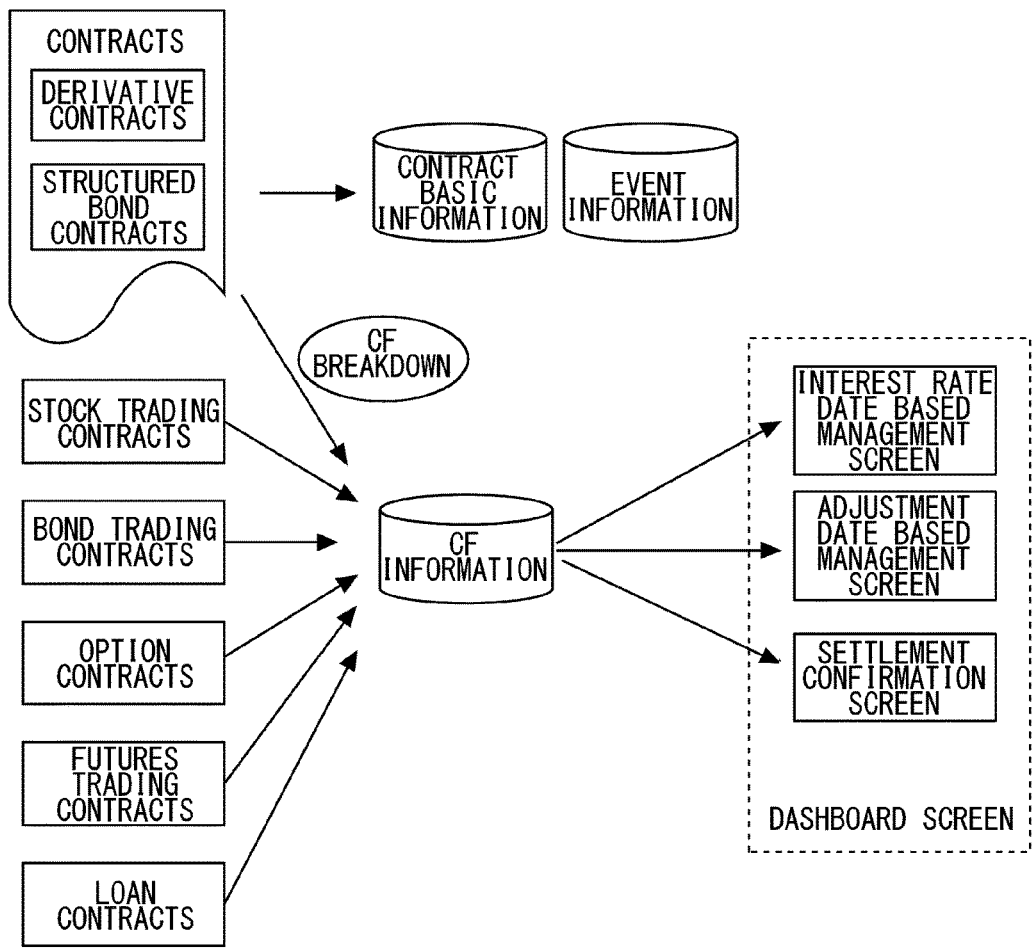
FIG. 1 is a diagram that shows an overview of an information management system according to an embodiment.

The invention will now be described by reference to the preferred embodiments. This does not intend to limit the scope of the present invention, but to exemplify the invention.

As stated previously, there are various financial transaction contracts, and details of each item determined in a contract are multifarious. Operations required from when a contract is made until settlement is performed are generally classified into contract (legal) information management operations, due date management operations, and settlement operations. The contract operations are operations for checking contract conditions including the parties, object of transaction, and contract period. The due date management operations include calculation and confirmation of a settlement amount required to perform settlement. The settlement operations include managing funds for settlement and actually performing settlement.

Such operations required to perform settlement are different for each financial institution, each organization in a financial institution, each person in charge of management, and each type of contract, so that standardization of the operations is difficult; accordingly, operational support by means of an information system has not been sufficiently provided. Therefore, a wide variety of operations for performing settlement in the future defined in various contracts have been managed by individuals and managed and performed manually, thereby causing operation risks.

Also, since details of each item in a contract are multifarious, it has been difficult to determine items used to register information necessary to manage various contracts in an information system. Accordingly, in conventional contract management operations in a financial institute or the like, contract documents have been often stored in binders or the entire contract documents have been often stored as they are in a database. Namely, it is hard to say that management of information related to contracts could have been effectively supported by information systems.

More specifically, when contract documents are stored as they are in an information system, information related to the same contract can be shared by multiple people, but only information necessary for each person cannot be extracted from the information system. For example, a person in charge of settlement execution operations does not need information regarding the parties, contract date, or object of contract but do need information regarding calculation of a settlement amount required to perform settlement or information regarding whether or not the settlement amount has been confirmed; however, it has been difficult to extract only the latter information while excluding the former information. Accordingly, with a conventional mechanism, management operations related to contracts must be performed by individuals manually, thereby causing operation risks and increasing work burden on a person in charge.

Therefore, the embodiment proposes an information management system enabling efficient management of settlement, such as efficient contract management or fund management, based on a financial transaction contract including an over-the-counter derivative contract. First, a first feature of the information management system according to the embodiment will be described.

The inventors have conceived that complicated financial transaction contracts for over-the-counter (OTC) derivatives or structured bonds, or even agreements that are not based on contract documents, such as an agreement for settlement of a dividend on valuable securities, can be organized by classifying the contents of the agreement into the three elements of basic information, cash flow information (hereinafter, also referred to as "CF information"), and event information. In other words, the inventors have considered that, by organizing contents of agreements for future settlement based on the three common elements of the basic information, CF information, and event information, various agreements can be stored on a standard basis by means of information and communication technology (ICT), thereby effectively supporting operations for performing settlement.

The basic information is information of items related to the subject and object of an agreement, the agreement period, and, in the case of a contract, the termination and start of the contract, and the basic information includes the object of transaction, parties, contract date, effective date, contract expiration date, and conditions for cancellation. The CF information is information required to perform settlement on a settlement date specified in an agreement, including the settlement date, the payer and payee of the settlement amount, a conditional equation for calculating the settlement amount, information regarding the transfer account for the settlement amount, and the settlement currency. The settlement date is a transfer date on which property is transferred; the settlement means performing processing required to perform transfer, such as determining a transfer amount of property, and completing the transfer of property; and the settlement amount is a transfer amount of property to be transferred. Namely, the CF information is information of items related to conditions for determining a transfer amount of property and completing the transfer of property on a transfer date of the property, among pieces of information included in an agreement. The event information is information of items related to additional conditions that would affect at least one of the basic information and CF information, such as knock-in price and a reference index.

In the system according to the embodiment, complicated contents of a contract are separated into the basic information, CF information, and event information, so as to be managed in standardized data structures. Accordingly, centralization of contract management and due date management is enabled for a wide variety of financial transactions in small volumes, thereby supporting handling of an increased number of contracts due to improved work efficiency.

With a financial transaction contract, there arise various contract management operations and due date management operations, such as the contract (legal) information management operations including checking contract conditions, the due date management operations for determining a settlement amount defined in a contract and organizing conditions for performing settlement, and the settlement operations for performing settlement on a settlement date. However, with a conventional system, it is difficult to store and manage various forms of arrangements in standardized formats in an information system. Accordingly, it is also difficult to collectively support various operations arising in each of the various agreements.

It is also difficult, with a conventional system, to separate information regarding a contract, for multiple operations related to the contract. Namely, it has been conventionally difficult to extract and process information necessary for each of multiple operations arising in a contract so as to generate information to effectively support each operation process. For example, even though the entire information of a contract could have been acquired, it has been difficult to acquire only information necessary for each of the contract (legal) information management operations, due date management operations, and settlement operations for the contract.

In the system according to the embodiment, registrations of multiple pieces of various contract information are collectively received, and pieces of information regarding each contract are organized and stored in standardized data structures. Also, necessary information is extracted to support each of the contract (legal) information management operations, due date management operations, and settlement operations arising in implementation of each contract, and the information is processed, such as used for calculation, as needed, and displayed for each operation. Accordingly, multiple pieces of contract information can be registered in the same system and separated for multiple kinds of operations, such as the contract (legal) information management operations, due date management operations, and settlement operations, thereby supporting implementation of operations required for each contract.

Next, a second feature of the information management system according to the embodiment will be described with reference to FIG. 1. FIG. 1 shows an overview of an information management system according to the embodiment. An information management system 10 collectively manages flow information indicating transfer of property related to each of various agreements in which transfer of money or an article at a future time is specified. The various agreements include a variety of financial transaction contracts and article transaction contracts. The money includes cash and currency in each country and also includes electronic data (electronic money or the like). The articles include actual objects and financial products, such as checks, bills, and stock certificates. The rights related to money or articles include various credits and debts, such as accounts receivables, accounts payables, structured bonds, and options. Thus, any agreement that specifies transfer of property at a future time could be managed by the information management system 10; however, for brevity, it is assumed in the following description that an agreement to be managed is a financial transaction contract, and an object to be transferred is money.

The information management system 10 collectively manages cash flow information that indicates transfer of money at a future time specified in each of multifarious financial transaction contracts, including contracts for derivatives, structured bonds, stock trading, and futures trading. In other words, an agreement that can be broken down into cash flows could be managed by the information management system 10. Although not shown in FIG. 1, payment of salaries by a company to employees can also be managed by the information management system 10, for example, as transfer of money is included therein.

With regard to contracts for derivatives and structured bonds, the information management system 10 according to the embodiment manages each of the basic information, event information, and CF information described in the contract documents. With regard to the other types of financial transaction contracts, the information management system 10 manages the CF information, especially cash flow details, as will be described later. As a modification, the basic information and event information may also be managed for financial transaction contracts other than contracts for derivatives and structured bonds.

The information management system 10 provides a management screen that collectively shows CF information of multiple types of financial transaction contracts, based on a condition in common among the multiple types of financial transaction contracts (hereinafter, also referred to as a "common management condition"), such as a due date, an interest rate date, and whether or not the settlement has been confirmed. The information management system 10 also provides a dashboard screen that is a collective screen of multiple management screens based on multiple common management conditions for CF information of multiple types of financial transaction contracts and that collectively shows extraction state of contracts and cash flows based on the multiple common management conditions.

Figure 2:
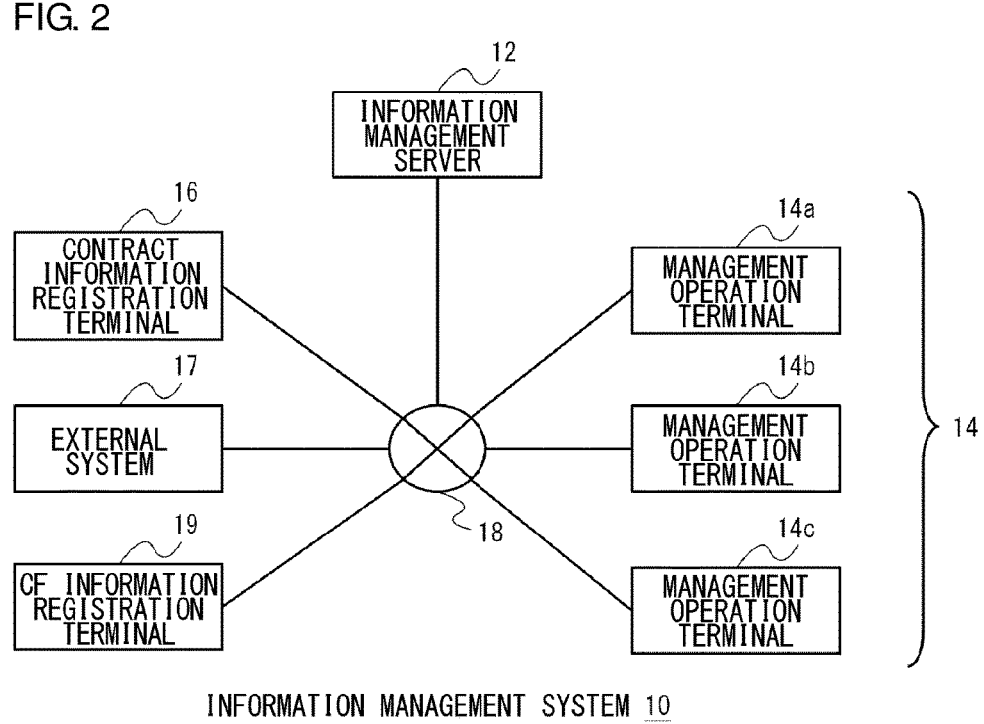
FIG. 2 is a diagram that shows a configuration of the information management system according to the embodiment.

FIG. 2 shows a configuration of the information management system 10 according to the embodiment. The information management system 10 can be regarded as a settlement support system for supporting execution of settlement and can also be regarded as a contract management system for managing a contract that specifies future settlement. Further, the information management system 10 can also be regarded as a cash flow management system for managing financing (cash flow) in an enterprise. The information management system 10 may be an information processing system constructed for a financial institute, such as a bank and a securities company, for example.

The information management system 10 comprises an information management server 12 and management operation terminals 14. The information management system 10 is connected to a contract information registration terminal 16, an external system 17, and a CF information registration terminal 19, via a communication network 18, such as a LAN, a WAN, and the Internet. The contract information registration terminal 16 is an information terminal, such as a PC, into which a person in charge in a financial institute or a customer enters contract information.

The management operation terminals 14 are information terminals, such as PCs, operated by persons in charge of performing operations for managing various financial transaction contracts. More specifically, the management operation terminals 14 are terminals used to manage and perform operations related to a contract, such as checking contract conditions, and confirming and executing settlement based on the contract. The management operation terminals 14 include a management operation terminal 14a, a management operation terminal 14b, and a management operation terminal 14c. For example, the management operation terminal 14a may be a terminal for a person in charge of the contract (legal) information management operations, the management operation terminal 14b may be a terminal for a person in charge of the due date management operations, and the management operation terminal 14c may be a terminal for a person in charge of the settlement operations.

The external system 17 is an external system that generates CF information, such as an enterprise system for financial transactions by which account processing and settlement processing is performed in a financial institute. In the embodiment, the external system 17 manages the stock trading contracts, bond trading contracts, option contracts, and futures trading contracts shown in FIG. 1, and registers CF information specified in each contract in the information management server 12. The CF information registration terminal 19 is a terminal operated by a person in charge in a financial institute and registers, in the information management server 12, CF information specified in a financial transaction contract according to the operation by the person in charge. In the embodiment, the CF information registration terminal 19 registers, in the information management server 12, CF information specified in the loan contracts shown in FIG. 1.

The information management server 12 collectively manages pieces of information regarding the multiple types of financial transaction contracts shown in FIG. 1 and provides user interfaces for supporting contract management operations including operations related to execution of settlement, to the management operation terminals 14, contract information registration terminal 16, and CF information registration terminal 19. The physical configurations of the devices shown in FIG. 2, such as the number of each device, are not limited. For example, the information management server 12 may be implemented by cooperation of multiple server devices connected to each other via the communication network 18.

Figure 3:
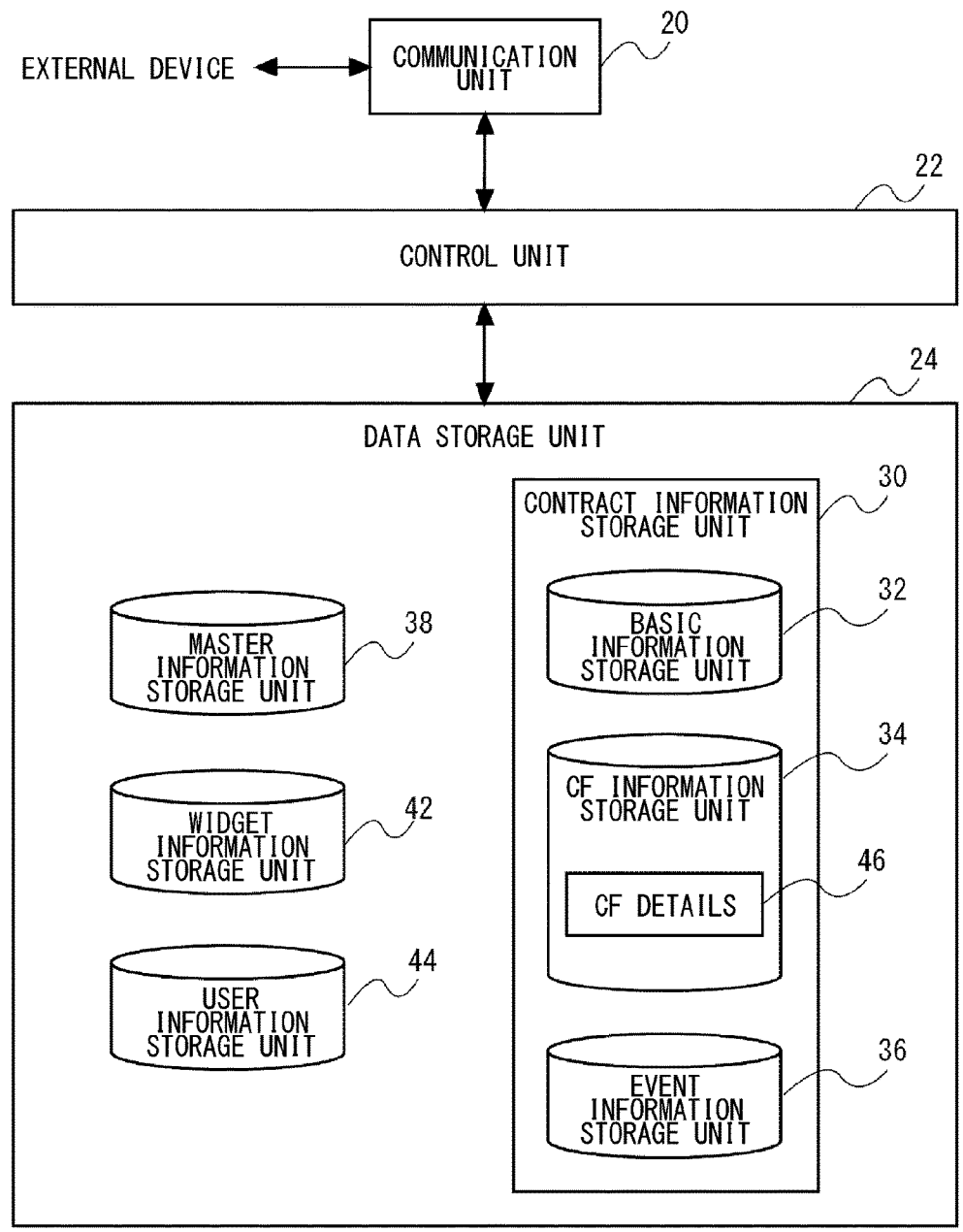
FIG. 3 is a block diagram that shows a functional configuration of an information management server shown in FIG. 2.

FIG. 3 is a block diagram that shows a functional configuration of the information management server 12 shown in FIG. 2. The information management server 12 comprises a communication unit 20, a control unit 22, and a data storage unit 24. The communication unit 20 transmits data to or receives data from an external device via the communication network 18 according to a predetermined communication protocol. The control unit 22 performs various data processes for supporting operations related to a financial transaction contract. The data storage unit 24 is a storage area that stores various data.

Each block shown in this specification can be implemented by an element such as a CPU or memory of a computer or by a mechanism in terms of hardware, and by a computer program or the like in terms of software. FIG. 3 illustrates functional blocks implemented by the cooperation of those components. Therefore, it will be obvious to those skilled in the art that the functional blocks may be implemented in a variety of forms by combinations of hardware and software.

For example, a program module corresponding to each of the functional blocks in the control unit 22, which will be described later in association with FIG. 5, may be installed on a storage of the information management server 12, via a recording medium that stores the program module. Also, a function of each functional block in the control unit 22 may be implemented when a CPU of the information management server 12 reads a corresponding program module into the main memory and executes the program module, as needed. Further, each functional block in the data storage unit 24 may be implemented when a storage apparatus, such as a storage or main memory, stores predetermined electronic data or electronic data input from external.

The data storage unit 24 comprises a contract information storage unit 30, a master information storage unit 38, a widget information storage unit 42, and a user information storage unit 44. The contents of each of multiple financial transaction contracts registered in the information management server 12 are classified into the three elements of basic information, CF information, and event information, and the contract information storage unit 30 stores the classified contents. The contract information storage unit 30 includes a basic information storage unit 32, a CF information storage unit 34, and an event information storage unit 36.

The basic information storage unit 32 stores basic information included in contract information registered in the information management server 12. In other words, the basic information storage unit 32 stores information, such as a character string and a numerical value, specified for an item that belongs to the basic information among multiple items included in the contract information.

The CF information storage unit 34 stores CF information included in contract information registered in the information management server 12. In other words, the CF information storage unit 34 stores information specified for an item that belongs to the CF information among multiple items included in the contract information. The CF information storage unit 34 also collectively accumulates details information of a cash flow occurring at a future time specified in each of the multiple types of financial transaction contracts shown in FIG. 1 (derivatives, structured bonds, futures trading, loans, etc.)

More specifically, the CF information storage unit 34 stores CF details 46, which are pieces of information that each indicate transfer of money at a future time specified in CF information and also indicate the transfer amount (the amount of money). The CF information storage unit 34 stores information of a cash flow of which the determining conditions, such as the interest rate, payment date, and payment amount, have been fixed (CF fixed details). The CF information storage unit 34 also stores information of a cash flow of which the determining conditions, such as the interest rate, payment date, and payment amount, have not been fixed.

Figure 4:
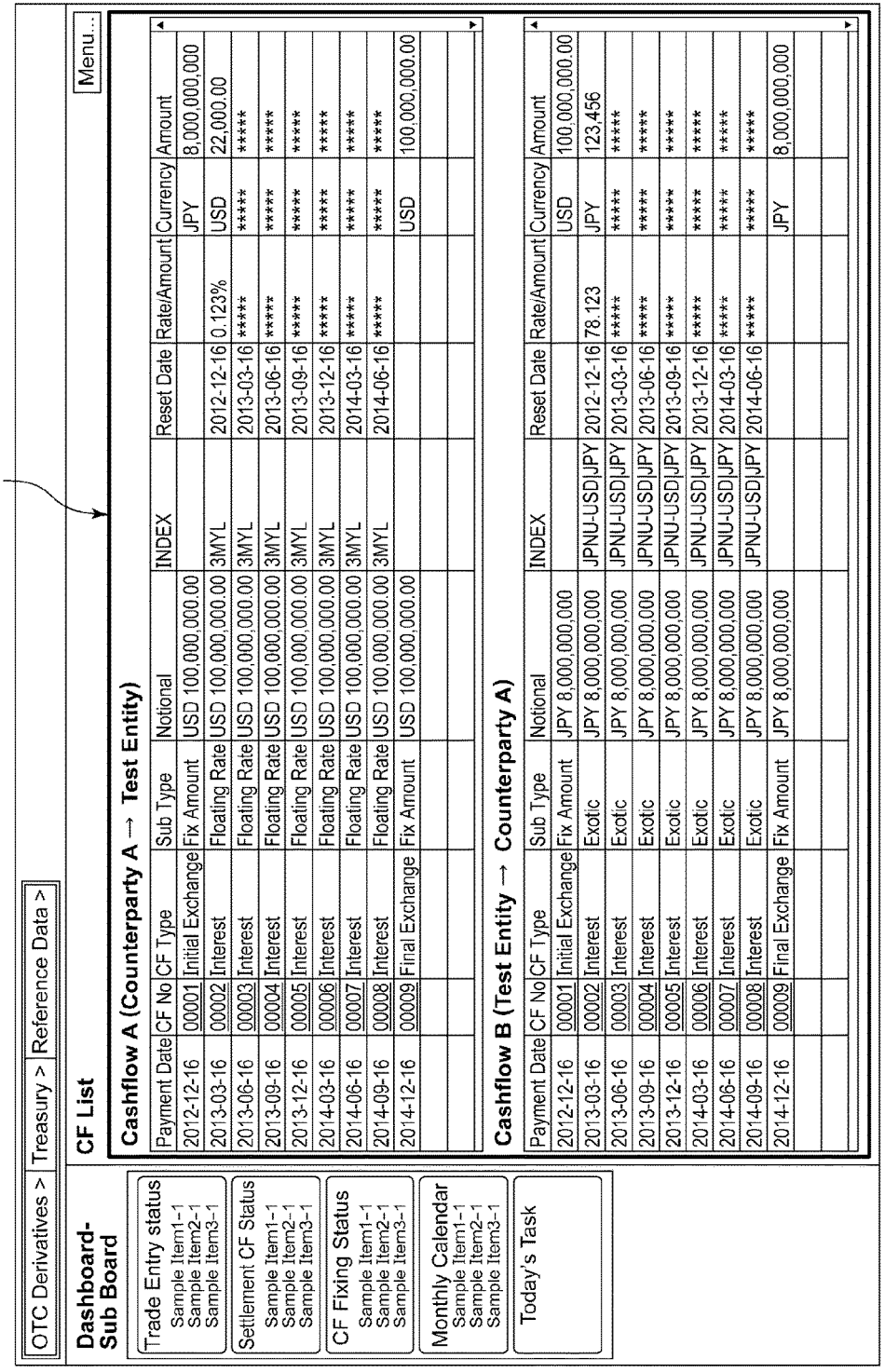
FIG. 4 shows cash flow details.

FIG. 4 shows cash flow details (CF details 46) stored in the CF information storage unit 34. FIG. 4 shows the CF details 46 for a swap contract by which swap trading between the U.S. dollar and the Japanese yen is performed. As shown in FIG. 4, the CF details 46 include a cash flow from a first party to a second party (Cashflow A in FIG. 4, for example) and a cash flow from the second party to the first party (Cashflow B in FIG. 4, for example).

Also, the CF details 46 include one or more cash flows for one contract. FIG. 4 shows a cash flow list 118 in which multiple cash flows are listed in chronological order and in which are shown cash flows of interest payment that occurs every three months between the start date and the end date of the contract. The CF details 46 include the records with the CF numbers 00001, 00002, and 00009 as CF fixed details of fixed cash flows. For example, the CF number 00002 represents a cash flow of interest payment of which the interest rate has been fixed after the interest rate date (interest rate fixing date, or reset date), so that the payment amount has also been fixed. The CF details 46 may include CF fixed details in a manner such that CF information entered in an unfixed state is stored, and, when the unfixed record in the CF details is fixed, the status thereof is changed to "Fixed", or a flag indicating "Fixed" is set on the record. Alternatively, separately from a storage area for the CF details 46, another storage area for only storing CF fixed details may be provided in the CF information storage unit 34.

Referring back to FIG. 3, the event information storage unit 36 stores event information included in contract information registered in the information management server 12. In other words, the event information storage unit 36 stores information specified for an item that belongs to the event information among multiple items included in the contract information. Each of multiple contracts is assigned an identification code for uniquely identifying the contract. For example, basic information, CF information, and event information related to the same contract include the same contract ID and are associated with each other by the contract ID. For cash flows, each cash flow is also assigned another identification code (the cash flow number, or CF No., in FIG. 4, for example).

The contract information storage unit 30 stores the basic information, CF information, and event information, with each of which information indicating whether or not confirmation has been made by a person in charge in a financial institute is associated. For example, the basic information storage unit 32, CF information storage unit 34, and event information storage unit 36 store a flag indicating whether or not confirmation has been made by a person in charge of the contract (legal) information management operations in a financial institute, in association with a piece of basic information, CF information, and event information, respectively. The CF information storage unit 34 also stores a flag indicating whether or not confirmation has been made by a person in charge of the due date management operations or the settlement operations in a financial institute, in association with each record of cash flows stored as the CF details 46.

The information indicating whether or not confirmation has been made may be stored separately from the basic information, CF information, and event information. For example, as a matter of course, a table containing a contract information ID and a flag that indicates whether or not confirmation has been made by a person in charge of the contract (legal) information management operations and that is associated with the contract information ID may be provided separately from a table containing a piece of CF information and a flag that indicates whether or not confirmation has been made by a person in charge of the due date management operations or the settlement operations and that is associated with the piece of CF information.

The master information storage unit 38 stores master information, which is information to be referred to in order to fix an amount of money in a cash flow for each of multiple contracts. The master information includes market information, such as interest rates, exchange rates, and various index values (economic index values), to be referred to in order to calculate a settlement amount, i.e., an amount of money in a cash flow. The master information also includes world calendar information, such as date and time information indicating, for example, the current date and time in each market throughout the world, required when a date on which a settlement amount is calculated is specified.

Thus, the master information includes information commonly used for multiple contracts, and, in addition, the master information further includes information that is used for each contract and that may be different for each contract. For example, the master information includes identification information of a bank and an account for settlement as attribute information of a party to a contract, i.e., the payer or payee in a cash flow, and information indicating whether or not netting is specified. When contract information or CF information is registered, master information for each contract may also be registered.

The widget information storage unit 42 stores an information item displayed in each widget and logic used to generate a value for the item, with respect to multiple widgets displayed on a dashboard screen, which will be described later. The logic is a program provided with logic or algorithm used to extract specific data with reference to contract information in the contract information storage unit 30 and obtain a result of calculation using the extracted data. For example, with regard to newly registered contracts, the logic may be a program for counting the number of contracts for which confirmation processing has been completed and also counting the number of contracts for which confirmation processing has not been completed yet. Also, with regard to registered contracts, the logic may be a program for counting the number of contracts for which confirmation processing for the adjusted amount has been completed and also counting the number of contracts for which confirmation processing has not been completed yet.

The logic of each widget may be logic for extracting specific contract information (including cash flow details) from among multiple contracts for multiple types of financial transactions managed by the information management server 12, using a condition in common among the multiple types of financial transactions, such as an interest rate date, a due date, and whether or not confirmation has been made, as a search key. Also, content data of each widget may be extraction state of one or more pieces of contract information based on the logic, such as the number of pieces of extracted information, or the number of search hits.

For the data of each widget stored in the widget information storage unit 42, link information indicating a relevant management screen is specified. The "relevant management screen" is a management screen that displays contract information (including cash flow details) extracted based on a contract information extraction condition specified in the logic of each widget, for example. It can be said that a management screen shows details of contract information (including cash flow details) that meets a specific condition, such as a due date, and the content of a widget shows the number of pieces of contract information that meets the condition. When a certain widget is selected on a dashboard screen, a display control unit 50, which will be described later, switches the display to a management screen that shows contract information extracted based on a condition for the selected widget.

The user information storage unit 44 stores information (hereinafter, referred to as "user information"), which is set for each user of the information management server 12, such as each person in charge of the contract operations, due date management operations, and settlement operations in a financial institute, and which specifies a widget to be displayed on a dashboard screen, which will be described later, among multiple widgets.

Figure 5:
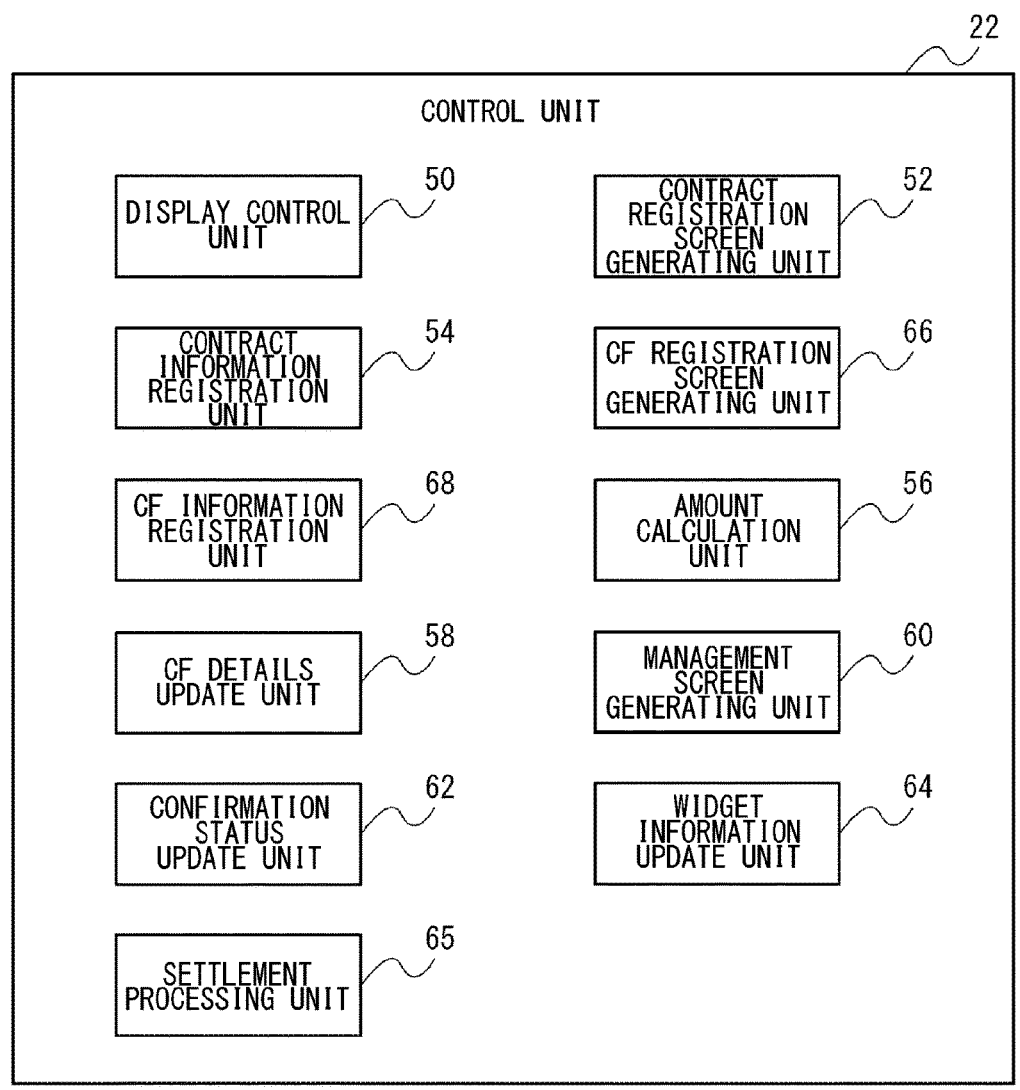
FIG. 5 is a block diagram that shows a control unit shown in FIG. 3 in detail.

FIG. 5 is a block diagram that shows the control unit 22 shown in FIG. 3 in detail. The control unit 22 comprises the display control unit 50, a contract registration screen generating unit 52, a contract information registration unit 54, a CF registration screen generating unit 66, a CF information registration unit 68, an amount calculation unit 56, a CF details update unit 58, a management screen generating unit 60, a confirmation status update unit 62, a widget information update unit 64, and a settlement processing unit 65.

The display control unit 50 controls displaying of a user interface for contract management. More specifically, in response to a request from the contract information registration terminal 16, the display control unit 50 provides, to the contract information registration terminal 16, a contract information registration screen generated by the contract registration screen generating unit 52. Similarly, in response to a request from the CF information registration terminal 19, the display control unit 50 provides, to the CF information registration terminal 19, a cash flow details registration screen generated by the CF registration screen generating unit 66. Also, in response to a request from a management operation terminal 14, the display control unit 50 provides a management screen for contract management to the management operation terminal 14. The display control unit 50 also controls switching of a screen displayed on each terminal, or screen transition.

The contract registration screen generating unit 52 generates data of a contract registration screen, which is a screen used to register contract information in the information management server 12. The contract registration screen includes a basic information entry screen, a cash flow information entry screen (hereinafter, also referred to as a "CF information entry screen"), and an event information entry screen.

As will be described later in association with FIG. 6, the basic information entry screen has entry fields for basic information, including the subject of a contract (such as the name of a party), the object of a contract (such as money or an article to be traded), and a contract period (such as the start date and the end date). Also, as will be described later in association with FIGS. 7-9, the CF information entry screen has entry fields for CF information, including the details of an agreement for transfer of money. Further, as will be described later in association with FIG. 10, the event information entry screen has entry fields for event information as an additional condition that would affect at least one of the basic information and CF information.

The data storage unit 24 may store a combination of the basic information entry screen, CF information entry screen, and event information entry screen, with respect to each type of financial transaction contract, such as derivative contracts and swap contracts, or each type of financial product to be traded. The contract registration screen generating unit 52 may receive, via the display control unit 50, the type of a financial transaction specified by the contract information registration terminal 16 and may acquire data of a contract registration screen suitable for the type from the data storage unit 24.

The contract information registration unit 54 receives, from the contract information registration terminal 16, contract information entered on the contract registration screen and stores the contract information in the contract information storage unit 30. The contract information registration unit 54 receives registration of contract information for each of multiple contracts. More specifically, the contract information registration unit 54 acquires basic information entered on the basic information entry screen and stores the basic information in the basic information storage unit 32. Also, the contract information registration unit 54 acquires CF information entered on the CF information entry screen and stores the CF information in the CF information storage unit 34. Further, the contract information registration unit 54 acquires event information entered on the event information entry screen and stores the event information in the event information storage unit 36. Depending on the type of contract, contract information without event information may be registered.

The CF registration screen generating unit 66 generates data of a screen (hereinafter, referred to as a "CF registration screen") used to directly register, in the information management server 12, a cash flow occurring based on a financial transaction contract (a loan contract in the embodiment).

The CF information registration unit 68 receives, from the CF information registration terminal 19, cash flow data (it is assumed here to be the details data shown in FIG. 4) entered on a CF registration screen. Also, the CF information registration unit 68 provides to the external system 17 an interface (API) used to register cash flow data. The external system 17 then transmits the cash flow data to the information management server 12 via the API. The CF information registration unit 68 transfers cash flow data received from the CF information registration terminal 19 and external system 17 to the CF details update unit 58, which then records the cash flow data as the CF details 46 in the CF information storage unit 34.

The amount calculation unit 56 calculates a settlement amount (which is an amount in a cash flow and can also be regarded as an adjusted amount) for the parties, according to rules defined in the CF information of each registered contract. The rules include a date on which a settlement amount should be calculated, an economic index, such as an interest rate or an exchange rate, used to calculate the amount, and a calculation formula for the amount calculation. In the embodiment, the amount calculation unit 56 calculates a fixed amount in a cash flow for each record of the CF details 46 stored in the CF information storage unit 34.

For example, CF information specifies determining an adjusted amount or a settlement amount based on economic index values on a future date after the trade date. Upon the date on which a settlement amount should be calculated specified in the CF information, which is a certain future time with respect to the trade date and also a certain future time with respect to the date of registration of the contract in the information management server 12, the amount calculation unit 56 detects the fact. Accordingly, the amount calculation unit 56 calculates a fixed amount of settlement between the parties based on the current economic index values stored as master information in the master information storage unit 38.

When the contract information registration unit 54 stores new CF information in the CF information storage unit 34, the CF details update unit 58 identifies, based on the CF information, one or more cash flows that will occur at future times specified in the registered contract and records the cash flows as the CF details 46 (see FIG. 4). For example, if the CF information of a registered contract specifies four interest payments per year, four records of cash flow details for each year between the start date and the end date of the contract will be recorded as the cash flow details of the contract. The CF details update unit 58 also records, as the CF details 46, details data of a cash flow provided by the CF information registration unit 68.

Also, when the amount calculation unit 56 calculates a fixed amount in a cash flow recorded as the CF details 46, the CF details update unit 58 records, as the CF details 46, the details data of the cash flow including the fixed amount.

The settlement processing unit 65 acquires necessary information from the master information storage unit 38 and the CF information storage unit 34 to generate information necessary for execution of settlement. For example, the settlement processing unit 65 acquires, from the master information storage unit 38, information with regard to a bank and an account for settlement and whether or not netting is specified, so as to generate information used to determine the settlement method, and the settlement processing unit 65 also acquires, from the CF information storage unit 34, information of CF fixed details, so as to generate data used to perform the settlement.

The management screen generating unit 60 generates data of a management screen for supporting various operations related to a financial transaction contract, based on contract information stored in the contract information storage unit 30. More specifically, the management screen generating unit 60 extracts pieces of information of predetermined items necessary for each of multiple kinds of operations, such as contract (legal) information management operations, due date management operations, and settlement operations, related to management of a financial transaction contract and settlement therefor, from the basic information storage unit 32, CF information storage unit 34, and event information storage unit 36, so as to generate screen data, in which the extracted pieces of information are arranged according to a predetermined format, for each of the operations. The management screen generating unit 60 may store correspondence relationships between multiple kinds of operations in a financial institute or another organization that manages financial transaction contracts and transfer of money or rights therefor, and information items necessary for the respective operations. Accordingly, the management screen generating unit 60 may extract information of a predetermined item related in advance to each operation from among pieces of contract information (basic information, CF information, and event information) stored in the contract information storage unit 30, so as to generate data of a management screen for supporting each operation.

For example, the management screen generating unit 60 receives a search condition entered by a user of a management operation terminal 14 and searches the CF information storage unit 34 for one or more records of cash flow details that meet the search condition. In other words, the management screen generating unit 60 acquires, from among multiple records of cash flow details for multiple types of financial transaction contracts (such as the derivative contracts through loan contracts in FIG. 1) stored in the CF information storage unit 34, one or more records of cash flow details that meet the search condition as a condition in common among the multiple types of financial transaction contracts. The management screen generating unit 60 generates data of a management screen that collectively displays, in the form of a list, one or more cash flow details that meet the search condition.

The management screens generated by the management screen generating unit 60 include the interest rate date based management screen, due date based management screen, and settlement confirmation screen shown in FIG. 1. The interest rate date based management screen collectively displays one or more records of cash flow details that include a certain interest rate date specified as a search condition. The due date based management screen collectively displays one or more records of cash flow details that include a certain due date (i.e., settlement date) specified as a search condition. The settlement confirmation screen collectively displays one or more records of cash flow details in the unconfirmed state specified as a search condition.

The management screen generating unit 60 also generates content data of each of multiple kinds of widgets, based on contract information stored in the contract information storage unit 30 and logic stored in the widget information storage unit 42. The management screen generating unit 60 then generates data of a dashboard screen in which the multiple kinds of widgets are arranged (see FIG. 14A). Also, the management screen generating unit 60 refers to information regarding a user to whom a dashboard screen is provided stored in the user information storage unit 44, so as to generate a dashboard screen in which widgets selected by the user are arranged.

For example, the management screen generating unit 60 generates data of a dashboard screen that is a collective screen of multiple management screens generated based on the respective search conditions, such as the interest rate date based management screen, due date based management screen, and settlement confirmation screen shown in FIG. 1, and that includes multiple widgets arranged. The management screen generating unit 60 sets, as content data of multiple widgets, information indicating extraction state of contract information (such as basic information, CF information, and cash flow details) based on multiple search conditions specified in advance, such as the number of contracts or cash flows that meet a search condition.

The confirmation status update unit 62 receives, from a management operation terminal 14, information (hereinafter, also referred to as a "confirmation notification") indicating that a person in charge has confirmed information entered on a management screen, such as contract information of which registration has been received, and a settlement amount (a fixed amount in a cash flow, for example). In the confirmation notification, the ID of a confirmed contract or the ID of a confirmed cash flow is specified. The confirmation status update unit 62 records, with respect to basic information, CF information, and event information identified by a contract ID or a cash flow ID specified in a confirmation notification, information indicating that confirmation has been made.

The widget information update unit 64 receives, from a management operation terminal 14, change information of logic for generating content displayed in a widget, or change information of rules for generating a management screen based on stored contract information. According to the change information thus received, the widget information update unit 64 updates the logic stored in the widget information storage unit 42. For example, the widget information update unit 64 updates a program for generating content of a widget stored in the widget information storage unit 42 so as to reflect the change information received from the management operation terminal 14.

A part of the functions provided by the information management server 12 of the embodiment, such as the function of presentation to a user, may be provided by the management operation terminals 14, contract information registration terminal 16, and CF information registration terminal 19. For example, the display control unit 50 and the management screen generating unit 60 may be provided in a management operation terminal 14. In this case, the information management server 12 may generate content data of a management screen, including an amount calculated by the amount calculation unit 56, or content data of each widget on a dashboard screen, so as to provide the data to the management operation terminal 14. The management operation terminal 14 may then display the content data provided by the information management server 12 on the management screen or in each widget on the dashboard screen.

In the same way, the display control unit 50 and the contract registration screen generating unit 52 may be provided in the contract information registration terminal 16. Thus, the functional blocks collectively provided in the information management server 12 of the embodiment may be implemented by cooperation, via the communication network 18, of multiple devices to which the functional blocks are distributed. Also, each of the management operation terminals 14, contract information registration terminal 16, and CF information registration terminal 19 may be implemented by a thin client using a web browser or the like, or may be implemented by a client application for registration and management of contracts, or a rich client provided with presentation logic.

There will now be described operations performed by the information management system 10 having the configurations set forth above.

A user who registers contract information in the information management system 10, such as a person in charge of contract registration in a financial institute, a customer of a financial institute, and a party to a contract, operates the contract information registration terminal 16 to access the information management server 12. The user registers basic information, CF information, and event information for each contract in the information management server 12. For example, the user registers pieces of information regarding multiple derivative contracts separately for each contract in the information management server 12.

More specifically, the contract information registration terminal 16 transmits, to the information management server 12, a request for a contract registration screen, with the type of a financial product to be traded in a contract specified. The contract registration screen generating unit 52 in the information management server 12 then generates data of a basic information entry screen, a CF information entry screen, and an event information entry screen for the type of the financial product, and the display control unit 50 transmits the respective screen data to the contract information registration terminal 16, which then displays the respective screen data accordingly.

FIG. 6 shows a basic information entry screen 110. The basic information entry screen 110 has entry fields of trade type, parties, trade date, start date, end date, principal, and the likes.

FIGS. 7-9 show CF information entry screens. A CF information entry screen 112 shown in FIG. 7 is a screen on which the details of each financial transaction are specified. A CF information entry screen 114 shown in FIG. 8 is a screen on which various parameters used for calculation of interest are specified. For example, the parameters include the trade period, trading date, types of the applied interest rate and index, date (such as a future date after the trade date, and a rule for determining the date), and the likes. For example, in FIG. 8, information regarding an agreement for four interest payments per year from Oct. 12, 2012 to Oct. 12, 2017 with a floating rate based on the index "3MYL" is entered.

A CF information entry screen 116 shown in FIG. 9 has an entry field for an arbitrary calculation formula used for calculation of interest. On the CF information entry screen 116 shown in FIG. 9, an arbitrary form of rule for determining a settlement amount, such as a calculation formula for a settlement amount, can be entered. The CF information entry screen 116 is typically used when a rule for determining a settlement amount does not fit into a general calculation form as shown in FIG. 7 or 8.

In order to enable entries of arbitrarily-determined rules for determining a settlement amount, the CF information entry screen 116 has an index field 170, a formula field 172, a selectable formula field 174, and a cap/floor field 176. In the index field 170, identification information of an economic index used in a calculation formula, such as an interest rate in each country, an exchange rate, and a stock index in each market, is entered. In the formula field 172, a calculation formula is entered. In the selectable formula field 174, definition of each element constituting a calculation formula, such as a rule for determining a variable included in a calculation formula, is entered. In the cap/floor field 176, an upper limit and a lower limit are entered.

In the example of FIG. 9, the variable "IR" is used for determination of an amount of payment, and whether to apply IR1 or IR2 is determined based on the value of the dollar-yen exchange rate. In the selectable formula field 174 in FIG. 9 is entered information indicating that the value of the element "IR", which is a constituent of a calculation formula entered in the formula field 172, is determined according to the value of an index specified in the index field 170. Thus, with the CF information entry screen 116, atypical CF information including a complex calculation formula can also be registered in the information management server 12.

As shown in FIGS. 6-9, names standardized by ISDA are used for the item names of the entry fields in a basic information entry screen and a CF information entry screen. Accordingly, a registrant of contract information basically needs to only transcribe the details of a contract as they are by relating the items of the contract to the items in a basic information entry screen and a CF information entry screen. Even if the items of a contract do not comply with the ISDA Master Agreement, using standard names in the ISDA Master Agreement for the item names of the entry fields facilitates mapping between the item names of the entry fields and the items of the contract.

Figure 10:
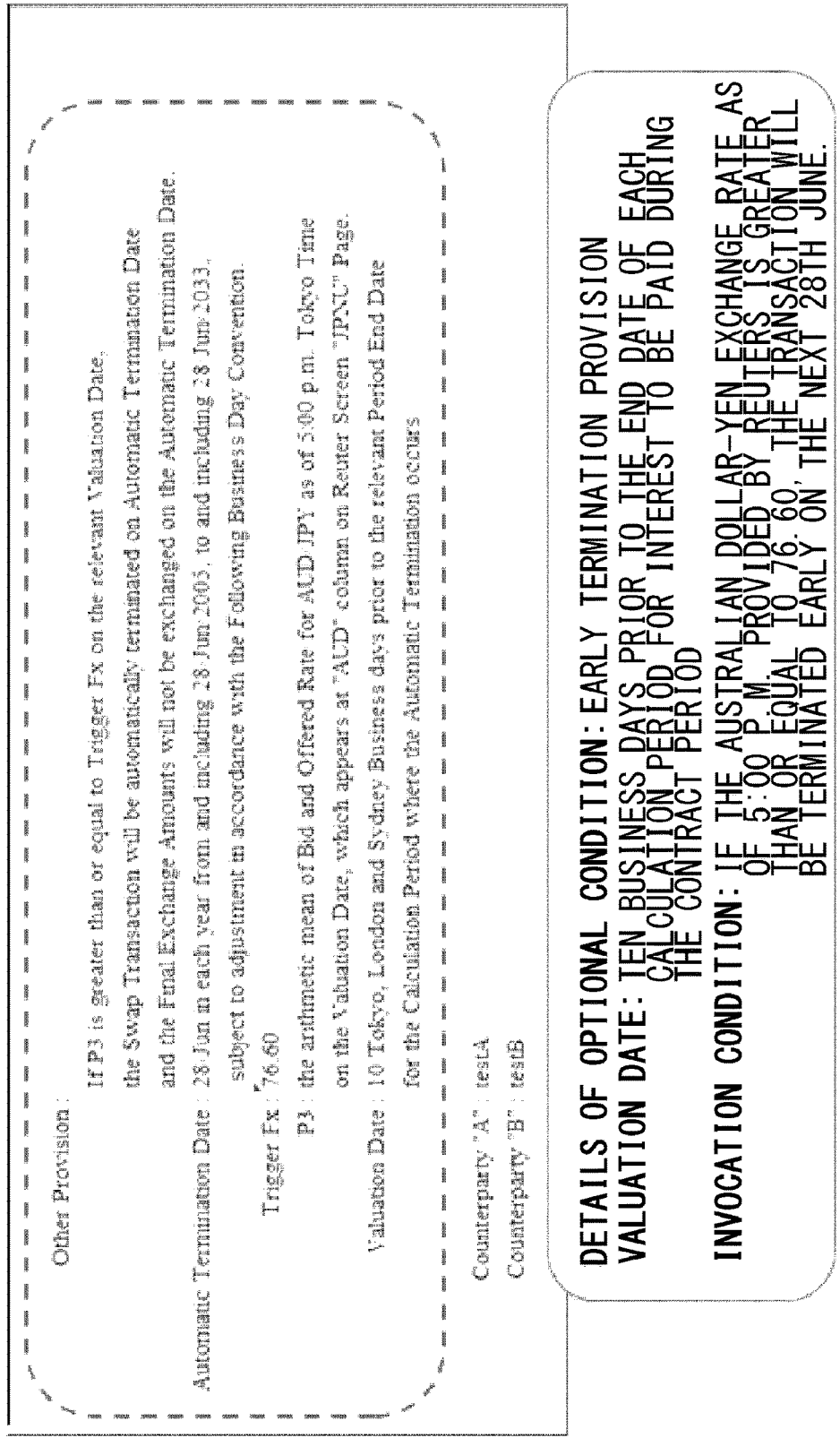
FIG. 10 shows an example of event information.

FIG. 10 shows an example of event information. Event information is typically a rider, such as a condition for early termination by which a contract is terminated during the contract period. There are an automatic invocation type using market index values and a pattern in which a contractor can arbitrarily execute invocation at predetermined timing. As an example of the automatic invocation type, FIG. 10 shows an optional condition in an interest rate swap confirmation sample provided by ISDA. The event information in FIG. 10 includes the details of the condition, valuation date, and invocation condition. As with the basic information entry screen and CF information entry screen, the event information entry screen also displays, as the item names of the entry fields, standard item names complying with the ISDA Master Agreement, such as the details of the condition, valuation date, and invocation condition.

When certain operation input for ordering registration of contract information is made on a contract registration screen, the contract information registration terminal 16 transmits the contract information entered on the contract registration screen to the information management server 12. Accordingly, the contract information registration unit 54 in the information management server 12 stores basic information entered on a basic information entry screen in the basic information storage unit 32, stores CF information entered on a CF information entry screen in the CF information storage unit 34, and stores event information entered on an event information entry screen in the event information storage unit 36. At the time, according to the CF information stored in the CF information storage unit 34, the CF details update unit 58 records one or more records of the CF details 46 for one or more cash flows scheduled for future times by the contract. Also, at the time of new registration, a confirmation flag indicating "unconfirmed" is related to the contract information (including CF details) and recorded.

A person in charge of loan contracts in a financial institute operates the CF information registration terminal 19 to access the information management server 12. The CF information registration terminal 19 transmits a request for a CF registration screen to the information management server 12. The CF registration screen generating unit 66 in the information management server 12 then generates data of a CF registration screen, and the display control unit 50 transmits the screen data to the CF information registration terminal 19, which then displays the screen data accordingly. The person in charge enters, on the CF registration screen, information regarding a cash flow that occurs in the loan contract, such as details information corresponding to one record in FIG. 4, and makes certain operation input for ordering the registration of the information. Accordingly, the CF information registration terminal 19 transmits the cash flow information entered on the CF registration screen to the information management server 12.

The external system 17 in a financial institute registers, in the information management server 12, information, such as details information corresponding to one record in FIG. 4, of a cash flow that occurs in each of various financial transaction contracts (such as the stock trading contracts and bond trading contracts shown in FIG. 1) that have been accepted by the external system 17 itself and for which account processing and the like is performed. More specifically, cash flow information is transmitted to the information management server 12 by calling an API for cash flow registration defined in advance in the information management server 12. The CF information registration unit 68 in the information management server 12 transfers cash flow information received from the CF information registration terminal 19 and external system 17 to the CF details update unit 58. The CF details update unit 58 then records the cash flow information provided by the CF information registration unit 68 as the CF details 46 in the CF information storage unit 34.

The amount calculation unit 56 in the information management server 12 refers to each of multiple pieces of contract information registered in the information management server 12 so as to calculate a fixed amount in one or more cash flows occurring between the parties based on each contract. For example, the amount calculation unit 56 identifies a record of the CF details 46 of which an interest rate fixing date has come, among multiple records of the CF details 46 stored in the CF information storage unit 34 and calculates a fixed amount in the identified record of the CF details 46 by inputting the interest rate on the day provided as master information into an amount calculation formula for the identified record of the CF details 46. Accordingly, the CF details update unit 58 updates the CF details 46 so that the record of the CF details 46 for which the amount calculation unit 56 has calculated the fixed amount is changed to a record of the CF fixed details that includes the fixed amount.

A person in charge of the due date management operations or the settlement operations in a financial institute operates a management operation terminal 14 to log in the information management server 12. It is assumed here that the person in charge performs the confirmation operation of cash flow details. The management operation terminal 14 transmits, to the information management server 12, a search request for cash flow details, for which a search condition, such as a specific due date or interest rate date (interest rate fixing date), entered by the person in charge is specified. The management screen generating unit 60 in the information management server 12 then receives the search request and acquires, from the CF information storage unit 34, a record of the CF details 46 that meets the search condition specified in the request. Accordingly, the management screen generating unit 60 generates a management screen on which the acquired cash flow information is provided. Thereafter, the display control unit 50 transmits the management screen data generated by the management screen generating unit 60 to the management operation terminal 14, which then displays the management screen data accordingly.

FIG. 11 shows the due date based management screen in FIG. 1, which is a management screen provided when a certain due date is specified as a search condition. As shown in FIG. 11, the due date based management screen displays the details of cash flows extracted based on the common condition of the due date "Dec. 24, 2013", irrespective of the type of the financial transaction contract, from among cash flows defined by multiple types of financial transaction contracts registered in the information management server 12. For example, the contract of which the product type is "loans" (contract number 001) is registered by the CF information registration terminal 19, the contracts of which the product type is "derivatives" (contract numbers 002 and 004) are registered by the contract information registration terminal 16, and the contract of which the product type is "futures" (contract number 005) is registered by the external system 17.

FIG. 11 also shows that one or more cash flows are generated from one contract. For example, the two cash flows identified by the CF numbers "002334" and "002335" are generated from a single contract identified by the contract number "002". Also, FIG. 11 shows that, since the floating rate is not fixed, the amount of payment is not fixed yet in the cash flow with the contract number 002 and CF number 002335. Further, since the two cash flows with the contract number 004 have the same direction, the adjusted amounts are summed as a result of netting; if the directions are opposite, the adjusted amounts will be cancelled out to be smaller as a result of netting.

A person in charge in a financial institute checks the cash flow details on the due date based management screen and, to confirm a cash flow, checks the box in the confirmation field and inputs a predetermined registration operation. Accordingly, the management operation terminal 14 transmits, to the information management server 12, the CF number of the record in which the confirmation field is checked and information indicating that the record has been confirmed. The confirmation status update unit 62 in the information management server 12 then records a flag indicating "Confirmed" for the record of the cash flow details confirmed on the due date based management screen and identified by the CF number. Thereafter, for the confirmed cash flow, settlement processing or the like is performed. The settlement processing may be performed by the external system 17, and the information management server 12 may transmit the confirmed record of the cash flow details (which may also include basic information or the like, as needed) to the external system 17 for execution of settlement.

FIG. 12 shows the interest rate date based management screen in FIG. 1, which is a management screen provided when a certain interest rate date is specified as a search condition. As shown in FIG. 12, the interest rate date based management screen displays the details of cash flows extracted based on the common condition of the interest rate date "Dec. 24, 2013", irrespective of the type of the financial transaction contract, from among cash flows defined by multiple types of financial transaction contracts registered in the information management server 12. In FIG. 12, in addition to the interest rate date, a cash flow to which a floating rate is applied is also specified as a search condition, and each of the "INDEX" fields shows the type of an economic index used for calculation in the cash flow. The "Rate" field showing "****" means that the relevant index value is not fixed. The operations of confirmation processing are similar to those for the due date based management screen.

Next, operations for providing a dashboard screen will be described. A person in charge of each of the contract operations, due date management operations, and settlement operations in a financial institute operates a management operation terminal 14 to log in the information management server 12. The management screen generating unit 60 in the information management server 12 generates a dashboard screen for a login user as a top screen after the login. More specifically, according to the logic of a widget related to the ID of a login user, the management screen generating unit 60 generates content data of each widget to be displayed on a dashboard screen for the login user. The management screen generating unit 60 then generates data of the dashboard screen on which one or more widgets related to the ID of the login user are arranged. Thereafter, the display control unit 50 transmits the dashboard screen data generated by the management screen generating unit 60 to the management operation terminal 14, which then displays the dashboard screen data accordingly.

Figure 13:
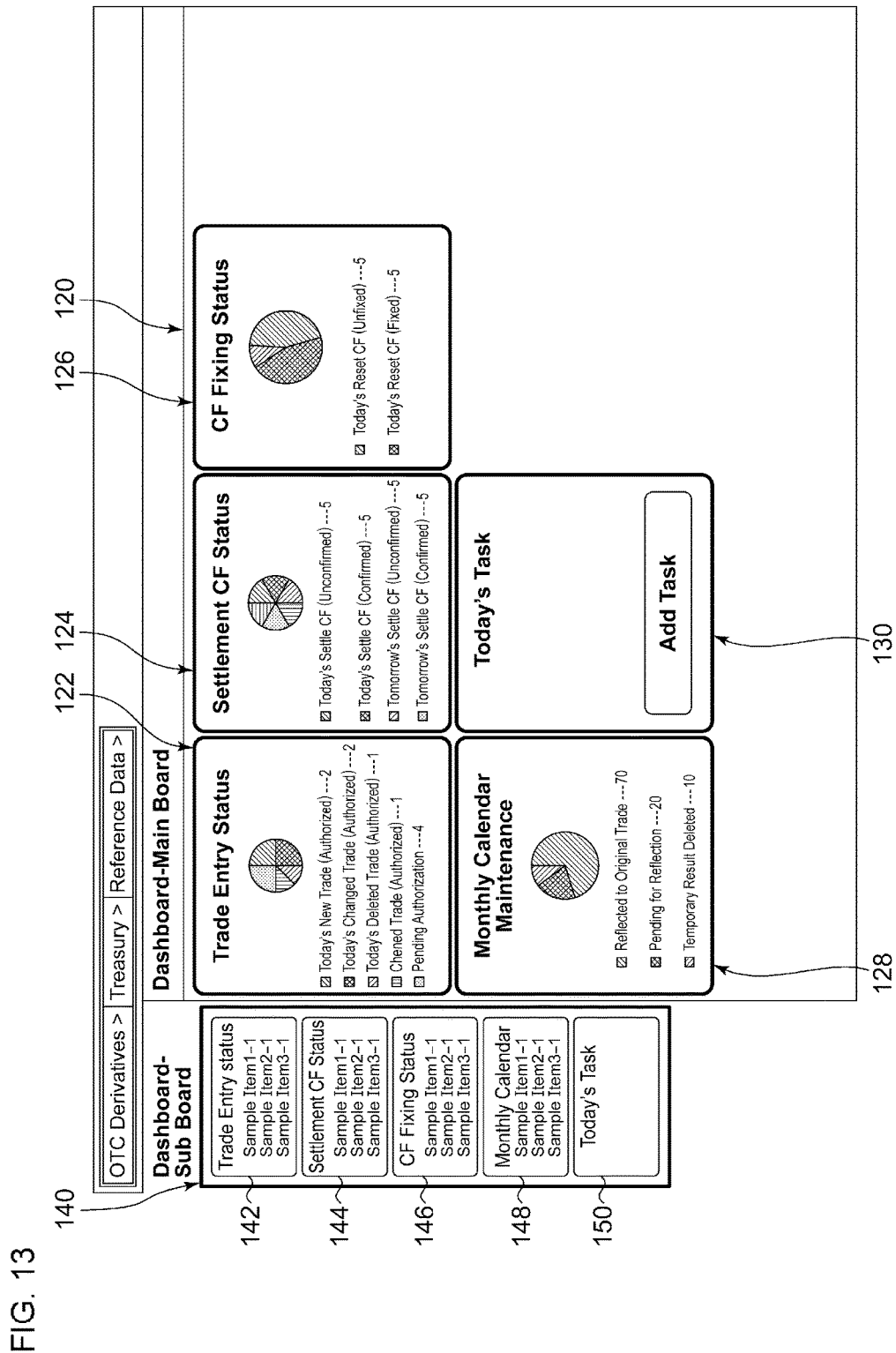
FIG. 13 shows a dashboard screen.

FIG. 13 shows a dashboard screen. A dashboard screen includes a main dashboard screen 120 and a sub dashboard screen 140. In this example, the main dashboard screen 120 includes a registration management widget 122, a due date management widget 124, a settlement management widget 126, a monthly schedule widget 128, and a task widget 130, which have been selected in advance by a user. The sub dashboard screen 140 also includes a registration management widget 142, a due date management widget 144, a settlement management widget 146, a monthly schedule widget 148, and a task widget 150.

The registration management widgets 122 and 142 are widgets for contract operations and may be actually provided only on a dashboard screen for a person in charge of contract operations. Similarly, the due date management widgets 124 and 144 are widgets for due date management operations and may be actually provided only on a dashboard screen for a person in charge of due date management operations. Also, the settlement management widgets 126 and 146 are widgets for settlement management operations and may be actually provided only on a dashboard screen for a person in charge of settlement operations.

Each widget on the main dashboard screen 120 shows data indicating the state of various operations, such as the progress of settlement and whether or not confirmation has been made, using a circular graph and numerical values. For example, the due date management widget 124 shows that there are five cash flows for which confirmation of settlement amounts has not been completed, i.e., there are five confirmation tasks to be processed by a person in charge, among cash flows of which the settlement dates are after the day of display of the screen and of which the settlement amounts need to be fixed on the day of display of the screen.

The due date management widget 124 also shows that there are five cash flows of which the settlement amounts have been confirmed, among cash flows of which the settlement amounts need to be fixed on the day of display of the screen. Thus, in each widget on the main dashboard screen 120 is provided information indicating extraction state of contracts or cash flows based on a condition specified as the logic of the widget, such as the number of contracts or cash flows that meet a search condition.

Upon certain operation input on a dashboard screen, the display control unit 50 in the information management server 12 transmits an edit screen for logic of a widget to the management operation terminal 14, which then displays the edit screen accordingly. Thereafter, the management operation terminal 14 transmits logic entered on the edit screen to the information management server 12, and the widget information update unit 64 in the information management server 12 then stores the received logic of a widget in the widget information storage unit 42. Accordingly, users can change logic for generating content of widgets by themselves.

Figure 14A:
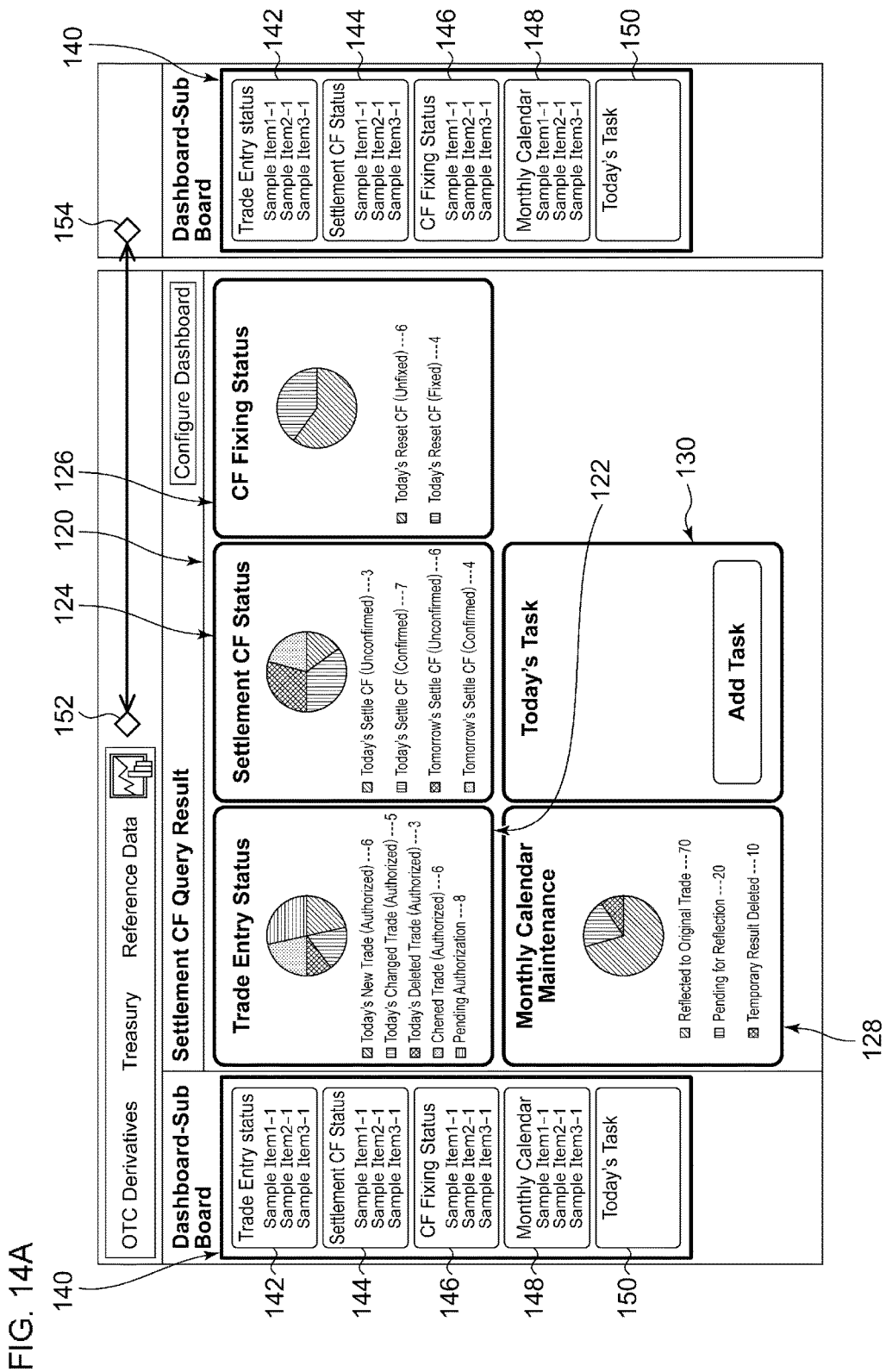
FIG. 14A shows another dashboard screen.

FIGS. 14A-14C show a dashboard screen and examples of screen transition from the dashboard screen. On a dashboard screen shown in FIG. 14A, a minimization button 152 is provided and, when the minimization button 152 is pressed, the display is switched to display of only the sub dashboard screen 140. On the dashboard screen only with the sub dashboard screen 140, a maximization button 154 is provided and, when the maximization button 154 is pressed, the main dashboard screen 120 is displayed again. When the "Configure Dashboard" button is clicked, the screen shifts to a selection screen for a widget displayed on the dashboard screen. The selection result on the selection screen is stored in the user information storage unit 44 of the information management server 12. Accordingly, a user can customize the widgets to be displayed on the user's own dashboard screen.

When a link string in a certain widget is selected on the main dashboard screen 120 and the sub dashboard screen 140 shown in FIG. 14A, the management operation terminal 14 transmits information indicating the selected link string to the information management server 12. The link string is, for example, "Today's Settle CF (Unconfirmed)" in the due date management widget 124.

The management screen generating unit 60 in the information management server 12 then acquires, from the widget information storage unit 42, logic (which can be regarded as screen generating logic and may also be regarded as contract information extracting logic) related to the selected link string. According to the acquired logic, the management screen generating unit 60 generates data of an individual management screen corresponding to the link string. On the individual management screen is displayed, for example, a search result, such as cash flow details found by the search, regarding cash flows for which confirmation of settlement amounts has not been completed, among cash flows of which the settlement amounts need to be fixed on the day of display of the screen. Thereafter, the display control unit 50 transmits the data of the individual management screen to the management operation terminal 14, which then switches the display of the dashboard screen accordingly.

For example, when a link string in the due date management widget 124 on the main dashboard screen 120 or in the due date management widget 144 on the sub dashboard screen 140 is selected in FIG. 14A, due date management screen 160 shown in FIG. 14B is displayed. The details of the due date management screen 160 in FIG. 14B correspond to those of the due date based management screen shown in FIG. 11.

Similarly, when a link string in the monthly schedule widget 128 on the main dashboard screen 120 or in the monthly schedule widget 148 on the sub dashboard screen 140 is selected, a monthly schedule screen 162 shown in FIG. 14C is displayed. As partly stated previously, when operation input, such as a user's confirmation operation, is made on an individual management screen, such as the due date management screen 160 and monthly schedule screen 162, the management operation terminal 14 transmits information indicating the details of the operation to the information management server 12. The information management server 12 then updates information in the contract information storage unit 30 according to the details of the operation. For example, the confirmation status update unit 62 records, with respect to contract information or cash flow details for which confirmation has been made, information indicating that confirmation has been made. An information update in the contract information storage unit 30 is fed back to the display of the dashboard screen, or the display content of a widget.

The management screen generating unit 60 in the information management server 12 generates data of a first management screen as an individual management screen that collectively displays basic information of multiple contracts. The management screen generating unit 60 also generates data of a second management screen that collectively displays CF information (such as information indicating a condition for transfer of money and cash flow details) of multiple contracts. Further, the management screen generating unit 60 generates data of a third management screen that collectively displays event information of multiple contracts. In response to a request from a management operation terminal 14, the display control unit 50 transmits the data of the first through third management screens to the management operation terminal 14, which then displays the data accordingly. In the request from a management operation terminal 14, a search condition, or an extraction condition as a condition in common among multiple contracts, such as a contractor's name and a due date, may be specified. In this case, the management screen generating unit 60 acquires, from the contract information storage unit 30, basic information, CF information, and event information that meets the extraction condition to generate the first through third management screens. In this way, the information management server 12 provides, to a management operation terminal 14, a management screen for collectively displaying information of multiple contracts on the single screen, for each of basic information, CF information (including cash flow details), and event information registered for each contract. This supports improvement of work efficiency for a person in charge of each of contract operations, due date management operations, and settlement operations in a financial institute.

As described above, the information management system 10 of the embodiment enables system management for complicated products and a wide variety of products in small volumes, which are currently managed manually, in units of contracts, cash flows, and events, using standardized data structures. Accordingly, operation risks due to manual operations for due date management or the like, or risks due to operations by individuals can be reduced. Also, such systemization can reduce work burden on a person in charge, thereby increasing the maximum number of transactions to be handled. Further, by storing pieces of contract information in units of contracts, cash flows, and events, efficient data management including prompt information search and easy change of data structure can be maintained.

The information management system 10 also collectively manages contracts for derivatives or other multifarious financial transactions in units of cash flows and provides a management screen that collectively displays pieces of cash flow information of the respective multifarious financial transactions. Accordingly, irrespective of the type of the financial transaction, or the type of the financial product to be traded, management operations after the breakdown into cash flows can be collectively supported by a common system, so that reduction of system costs can also be achieved. Also, upon reception of registration of a contract, the information management system 10 records the details of multiple cash flows that will occur at future times in the contract, so that confirmation management and due date management in units of cash flows is enabled.

Also, the information management system 10 provides a dashboard screen including multiple widgets, each of which is linked to a management screen and collectively shows the details of the management screen. The information management system 10 also provides a dashboard screen on which widgets suitable for a person in charge of each of contract operations, due date management operations, and settlement operations are arranged. This supports efficient performance of each of the contract operations, due date management operations, and settlement operations.

The present invention has been described with reference to the embodiment. The embodiment is intended to be illustrative only, and it will be obvious to those skilled in the art that various modifications to a combination of constituting elements or processes could be developed and that such modifications also fall within the scope of the present invention.

A first modification will now be described. As partly described previously, the information management server 12 can also manage information regarding an agreement for a right related to money or an article and can manage transfer of a right similarly to transfer of money as described in the embodiment. The rights related to money or articles include various securities, such as accounts receivables, accounts payables, and structured bonds. In this case, the CF registration screen generating unit 66 generates a registration screen (corresponding to the CF registration screen) used to register, in the information management server 12, information indicating conditions (including a date and various index values) for transfer of a right related to money or an article defined in the agreement. The CF information registration unit 68 stores, in the CF information storage unit 34, data indicating transfer of a right that will occur at a future time based on the agreement, entered on the CF registration screen.

The CF information storage unit 34 stores flow details information (corresponding to the CF details) that indicates transfer of a right that will occur at a future time defined in the agreement and a transfer amount of the right or a transfer amount of money required for the transfer of the right. The CF details update unit 58 updates the flow details information, as needed, at timing when transfer of a right based on the agreement is determined or the transfer amount of the right is fixed, for example. As with in the embodiment, the basic information storage unit 32 and the event information storage unit 36 store basic information and event information related to the agreement for the right, respectively. The management screen generating unit 60 extracts pieces of information of predetermined items necessary for each of contract operations, due date management operations, and settlement operations related to the agreement, from the basic information storage unit 32, CF information storage unit 34, and event information storage unit 36, so as to generate a screen for each of the operations.

A second modification will be described. The information management server 12 may further manage information regarding a transaction between a customer and a financial institute made by telephone or e-mail (which is also referred to as a "specific transaction"). The specific transaction may be an exchange transaction. The information management server 12 may autonomously acquire information (contract information, CF information, event information, or the like) related to a specific transaction, from an external device or an external system that manages information regarding the specific transaction, so as to accumulate the information. The information management server 12 may provide an entry screen (FIGS. 6-10, for example) for information related to a specific transaction, to the contract information registration terminal 16 or the CF information registration terminal 19. Accordingly, a person in charge in a financial institute may enter information on the entry screen, and the information management server 12 may receive and accumulate information related to the specific transaction transmitted from the contract information registration terminal 16 or CF information registration terminal 19. Also, the information management server 12 may manage information regarding a specific transaction similarly to information regarding a derivative contract as described in the embodiment and may update the CF details with the passage of time. Further, the information management server 12 may provide a management screen or a dashboard screen (FIGS. 11-14C, for example) used to view information regarding a specific transaction.

A third modification will be described. The information management server 12 may further receive registration of data of reception/payment of money (which may also be regarded as data indicating transfer of money) performed on a fixed date and may manage the state of the reception/payment of money based on the data. The reception/payment of money performed on a fixed date includes that for which a specific date is determined and that for which a condition for determining a payment date is specified, such as performing payment on the 25th of every month. For example, it may be reception/payment of money repeatedly performed every unit period, such as one month. The contract registration screen generating unit 52 of the third modification may provide a registration screen used to enter a future schedule related to reception/payment of money, with regard to, for example, transfer of salaries paid every month, payment of utilities including electricity and gas, and payment of insurance premiums. The contract information registration unit 54 may record, in the contract information storage unit 30, information entered on the registration screen, which is namely data of reception/payment of money performed on a fixed date. According to the registered data of reception/payment of money (such as a payment date and a payment condition), the amount calculation unit 56 and the CF details update unit 58 may calculate an amount to be received or paid on a future date and may record the amount. The management screen generating unit 60 may provide a management screen for data of reception/payment of money performed on a fixed date. The management screen may display a list in which are arranged pieces of information on one or more items of reception/payment of money and amounts to be received or paid for an arbitrary period specified by a user or for the latest arbitrary period.

Optional combinations of the aforementioned embodiment and modifications may also be practiced as additional embodiments of the present invention. Such an additional embodiment provided by a combination has each of the effects of the embodiment and modifications combined. It will be obvious to those skilled in the art that the function to be achieved by each constituent feature described in the claims may be implemented by each of the constituting elements described in the embodiment or modifications, or by the cooperation of those constituting elements.

What is claimed is:

1. An information management system to process information indicating contents of different types of agreements, the system comprising:
   at least one memory to,
      store, for each agreement among the different types of agreements, record information that classify the contents of each agreement into information elements including agreement information, and cash flow information including parameter information corresponding to at least one operation including operation information to calculate at least one settlement amount and/or at least one settlement date; and
      store a displayable application widget including logic to control a second extraction and display information indicating a state of the second extraction, of cash flow information for the different types of agreements from a first extracted cash flow information;
   at least one hardware processor coupled to the at least one memory to execute instructions stored in the at least one memory to cause the information processing system to,
      generate, from the information elements of each agreement in the stored record information, respective at least one record of cash flow detail information as the first extracted cash flow information indicating respective occurrence of at least one cash flow event according to the parameter information corresponding to the at least one operation including the operation information to calculate the at least one settlement amount and/or at least one settlement date;
      update the respective at least one record of cash flow detail information for each agreement in response to detection of the respective occurrence of the at least one cash flow event according to the parameter information corresponding to the at least one operation including the operation information to calculate the at least one settlement amount and/or the at least one settlement date; and
      display the application widget to execute the second extraction to display information in regions, each region including a displayed selectable link that displays information indicating respective states, according to the updated at least one record of the cash flow detail information for each agreement, of the second extraction of cash flow information for the different types of agreements corresponding to the logic of the application widget, and
         in response to a selection of the displayed selectable link, execute the second extraction of cash flow information from the first extracted cash flow information, by extracting a plurality of updated records of cash flow detail information from among the records of cash flow detail information and to generate a user interface screen to display the second extraction of cash flow information across the different types of agreements,
      the respective states of the second extraction of cash flow information corresponding to the logic of the widget include a number of updated at least one record of the cash flow detail information for each agreement that meet a search condition included in the logic of the widget.

2. The information management system according to claim 1, wherein a cash flow event among the at least one cash flow even is an interest rate date.

3. The information management system according to claim 2, wherein the selection of the displayed selectable link generates a search request according to the logic of the application widget to execute the second extraction.

4. The information management system according to claim 3, wherein
   the agreement information includes a type of the agreement; and
   to execute the second extraction, the search request includes the type of the agreement to extract.

5. The information management system according to claim 3, wherein
   the agreement information includes information of parties to the agreement, and
   to execute the second extraction, the search request includes the agreement information.

6. The information management system according to claim 3, wherein to execute the second extraction, the search request includes the interest rate date.

7. The information management system according to claim 1, wherein the information to classify the contents of each agreement into the information elements further include the information element of the at least one cash flow event indicating a condition for the agreement information and/or the cash flow information.

8. A computer program product comprising non-transitory computer readable programs which when executed by at least one computer cause the at least one computer to perform operations comprising:
   process information indicating contents of a different types of agreements, by:
      storing, for each agreement among the different types of agreements, record information that classify the contents of each agreement into information elements including agreement information, and cash flow information including parameter information corresponding to at least one operation including operation information to calculate at least one settlement amount and/or at least one settlement date; and
      storing a displayable application widget including logic to control a second extraction and display information indicating a state of the second extraction, of cash flow information for the different types of agreements from a first extracted cash flow information;
   generating, from the information elements of each agreement, in the stored record information, respective at least one record of cash flow detail information as the first extracted cash flow information indicating respective occurrence of at least one cash flow event according to the parameter information corresponding to the at least one operation including the operation information to calculate the at least one settlement amount and/or at least one settlement date;

updating the respective at least one record of cash flow detail information for each agreement in response to detection of the respective occurrence of the at least one cash flow event according to the parameter information corresponding to the at least one operation including the operation information to calculate the at least one settlement amount and/or the at least one settlement date; and display the application widget to execute the second extraction to display information in regions, each region including a displayed selectable link that displays information indicating respective states, according to the updated at least one record of the cash flow detail information for each agreement, of the second extraction of cash flow information for the different types of agreements corresponding to the logic of the application widget, and in response to a selection of the displayed selectable link, execute the second extraction of cash flow information from the first extracted cash flow information, by extracting a plurality of updated records of cash flow detail information from among the records of cash flow detail information and to generate a user interface screen to display the second extraction of cash flow information across the different types of agreements, the respective states of the second extraction of cash flow information corresponding to the logic of the widget include a number of updated at least one record of the cash flow detail information for each agreement that meet a search condition included in the logic of the widget.

* * * * *

UNITED STATES PATENT AND TRADEMARK OFFICE
CERTIFICATE OF CORRECTION

Page 1 of 1

PATENT NO. : 10,290,069 B2
APPLICATION NO. : 15/077490
DATED : May 14, 2019
INVENTOR(S) : Narumi Aramaki et al.

It is certified that error appears in the above-identified patent and that said Letters Patent is hereby corrected as shown below:

In the Claims

Column 26, Line 11:
In Claim 2, delete "even" and insert -- event --, therefor.

Signed and Sealed this
Sixteenth Day of July, 2019

Andrei Iancu
*Director of the United States Patent and Trademark Office*